(12) United States Patent
Hori et al.

(10) Patent No.: US 7,945,517 B2
(45) Date of Patent: May 17, 2011

(54) DATA DISTRIBUTION SYSTEM AND RECORDING DEVICE FOR USE THEREIN

(75) Inventors: Yoshihiro Hori, Gifu (JP); Toshiaki Hioki, Ogaki (JP); Miwa Kanamori, Ogaki (JP); Masataka Takahashi, Ishikawa (JP); Takayuki Hasebe, Kawasaki (JP); Makoto Yoshioka, Kawasaki (JP); Takahisa Hatakeyama, Kawasaki (JP); Tadaaki Tonegawa, Kodaira (JP); Takeaki Anazawa, Tokyo (JP)

(73) Assignees: Sanyo Electric Co., Ltd., Moriguchi-shi (JP); Fujitsu Limited, Kawasaki (JP); Renesas Electronics Corporation, Kawasaki-shi (JP)

( * ) Notice: Subject to any disclaimer, the term of this patent is extended or adjusted under 35 U.S.C. 154(b) by 1502 days.

(21) Appl. No.: 10/148,178

(22) PCT Filed: Dec. 5, 2000

(86) PCT No.: PCT/JP00/08593
§ 371 (c)(1),
(2), (4) Date: Jun. 4, 2002

(87) PCT Pub. No.: WO01/43342
PCT Pub. Date: Jun. 14, 2001

(65) Prior Publication Data
US 2002/0191764 A1 Dec. 19, 2002

(30) Foreign Application Priority Data
Dec. 6, 1999 (JP) .................................. 11-346861

(51) Int. Cl.
*H04L 9/00* (2006.01)
*G06F 11/00* (2006.01)

(52) U.S. Cl. ............................................. 705/51; 705/57
(58) Field of Classification Search .................... 705/51, 705/57, 24; 707/9; 709/219
See application file for complete search history.

(56) References Cited

U.S. PATENT DOCUMENTS
5,392,351 A * 2/1995 Hasebe et al. .................. 705/51
5,473,692 A 12/1995 Davis
(Continued)

FOREIGN PATENT DOCUMENTS
EP 0679979 A1 11/1995
(Continued)

OTHER PUBLICATIONS

European Pantent Application, filed on Nov. 5, 1998 and published on Apr. 26, 2000—Inventor:Katsumata et al. Title: Apparatus for Data Distribution, and terminal for data distribution App#:EP 0 996 074.*

(Continued)

*Primary Examiner* — Evens J Augustin
(74) *Attorney, Agent, or Firm* — Westerman, Hattori, Daniels & Adrian, LLP

(57) ABSTRACT

A memory card (110) stores access restriction information (AC1) to a license information hold unit (1440) arranged in a TRM area. Access restriction information (AC1) has information for example of a frequency of reproduction allowed and a number of licenses owned. A controller (1420) in reproducing and transferring content initially confirms access restriction information (AC1) and thereafter effects reproduction and transfer and after the reproduction and transfer are effected updates access restriction information (AC1), as required, for storage in a license information hold unit (1440).

10 Claims, 21 Drawing Sheets

U.S. PATENT DOCUMENTS

| | | | | |
|---|---|---|---|---|
| 5,671,412 A | * | 9/1997 | Christiano | 707/104.1 |
| 5,765,152 A | * | 6/1998 | Erickson | 1/1 |
| 5,790,664 A | * | 8/1998 | Coley et al. | 709/203 |
| 5,892,900 A | * | 4/1999 | Ginter et al. | 726/26 |
| 5,925,127 A | * | 7/1999 | Ahmad | 713/200 |
| 5,933,498 A | * | 8/1999 | Schneck et al. | 705/54 |
| 5,982,891 A | | 11/1999 | Ginter et al. | |
| 6,009,401 A | * | 12/1999 | Horstmann | 705/1 |
| 6,056,786 A | * | 5/2000 | Rivera et al. | 717/168 |
| 6,073,124 A | * | 6/2000 | Krishnan et al. | 705/59 |
| 6,226,618 B1 | * | 5/2001 | Downs et al. | 705/1 |
| 6,289,455 B1 | * | 9/2001 | Kocher et al. | 713/194 |

FOREIGN PATENT DOCUMENTS

| | | |
|---|---|---|
| EP | 0 813 194 A2 | 12/1997 |
| EP | 0 996 074 A1 | 4/2000 |
| JP | 10-3745 | 1/1998 |
| JP | 11-164058 | 6/1999 |
| JP | 11-328850 | 11/1999 |

OTHER PUBLICATIONS

Partial translation of Nikkei Electronics Mar. 22, 1999 (No. 739). See PCT search report.

Partial translation of Nikkei Electronics Mar. 8, 1999 (No. 738). See PCT search report.

Summons to attend oral proceedings dated Jan. 14, 2010, issued in corresponding European Patent Application No. 00979088.2.

Bursky, Dave: "Secure Memory-Card Standard Promises to Keep Digital Multimedia Under Control", Electronic Design, Oct. 4, 1999, p. 27.

European Office Action dated Nov. 15, 2010, issued in corresponding European patent Application No. 00 979 088.2.

Simson Garfinkel & Gene Spafford; "6.2 What is Encryption?"; Practical UNIX & Internet Security—Second Edition, Chapter 6: Cryptography, Apr. 1996.

European Search Report dated Aug. 3, 2007, Application No. 00979088.2-1245.

"Digital Transmission Content Protection Specification, Passage" Digital Transmission Content Protection Specification Revision 1.0 Informational Version, vol. 1, Apr. 12, 1999, pp. 1-59.

* cited by examiner

FIG.2

| NAME | ATTRIBUTE | HELD/PRODUCED AT: | FUNCTION & CHARACTERISTIC |
|---|---|---|---|
| Data | CONTENT DATA | | E.G., MUSIC DATA |
| Kc | LICENSE KEY | | KEY FOR DECRYPTING ENCRYPTED CONTENT DATA |
| {Data}Kc | ENCRYPTED CONTENT DATA | | CONTENT DATA ENCRYPTED DECRYPTABLE WITH SYMMETRIC KEY Kc. DISTRIBUTED IN THIS FORM FROM DISTRIBUTION SERVER. |
| Data-inf | ADDITIONAL INFORMATION | | E.G., PLAINTEXT INFORMATION FOR EXAMPLE ON COPYRIGHT OF CONTENT DATA OR RELATED TO SERVER ACCESS |
| CONTENT ID | INFORMATION OF CONTENT | DISTRIBUTION SERVER | CODE FOR IDENTIFYING CONTENT DATA Data |
| LICENSE ID | INFORMATION OF LICENSE | | MANAGEMENT CODE CAPABLE OF SPECIFYING ISSUANCE OF LICENSE (ALSO CAPABLE OF IDENTIFYING IT INCLUDING CONTENT ID) |
| AC | LICENSE PURCHASING CONDITION | | DESIGNATED BY USER (E.G., THE NO. OF LICENSES, LIMITATION OR FUNCTION) |
| AC1 | ACCESS RESTRICTION INFORMATION | | RESTRICTION ON MEMORY ACCESS (E.G., NO. OF TIMES OF REPRODUCTION ALLOWED) |
| AC2 | REPRODUCTION CIRCUIT CONTROL INFORMATION | | CONTROL INFORMATION IN CONTENT REPRODUCTION CIRCUIT (CELLULAR PHONE) (E.G., WHETHER REPRODUCTION IS ALLOWED/DISALLOWED) |

FIG.3

| NAME | ATTRIBUTE | HELD/PRODUCED AT | FUNCTION & CHARACTERISTIC |
|---|---|---|---|
| KPp(n) | PUBLIC ENCRYPTION KEY (ASYMMETRIC KEY) | CELLULAR PHONE | DECRYPTABLE WITH Kp(n). RECORDED IN THE FORM OF {KPp(n)//Cp(n)}KPma WHEN SHIPPED. n IS A VALUE DISTINGUISHING EACH CELLULAR PHONE TYPE |
| KPmc(m) | PUBLIC ENCRYPTION KEY (ASYMMETRIC KEY) | MEMORY CARD | DECRYPTABLE WITH Kmc. RECORDED IN THE FORM OF {KPmc(m)//Cmc(m)}KPma WHEN SHIPPED. m IS A VALUE DISTINGUISHING EACH MEMORY CARD TYPE |
| Kp(n) | PRIVATE DECRYPTION KEY | CELLULAR PHONE | DECRYPTION KEY UNIQUE TO CONTENT REPRODUCTION CIRCUIT (CELLULAR PHONE). n IS A VALUE DISTINGUISHING EACH CELLULAR PHONE TYPE |
| Kmc(m) | PRIVATE DECRYPTION KEY | MEMORY CARD | DECRYPTION KEY UNIQUE TO MEMORY CARD. m IS A VALUE DISTINGUISHING EACH MEMORY CARD TYPE |
| Cp(n) | CLASS CERTIFICATE | CELLULAR PHONE | CONTENT REPRODUCTION CIRCUIT CLASS CERTIFICATE. RECORDED IN THE FORM OF {KPp(n)//Cp(n)}KPma WHEN SHIPPED. n IS A VALUE DISTINGUISHING EACH CELLULAR PHONE TYPE |
| Cmc(m) | CLASS CERTIFICATE | MEMORY CARD | MEMORY CARD CLASS CERTIFICATE. RECORDED IN THE FORM OF {KPmc(m)//Cmc(m)}KPma WHEN SHIPPED. m IS A VALUE DISTINGUISHING EACH MEMORY CARD TYPE |
| Ks1 | | DISTRIBUTION SERVER | GENERATED FOR EACH DISTRIBUTION SESSION |
| Ks2 | SYMMETRIC (UNIQUE TO SESSION) | MEMORY CARD | GENERATED FOR EACH DISTRIBUTION/TRANSFER (RECEPTION) SESSION |
| Ks3 | | MEMORY CARD | GENERATED FOR EACH REPRODUCTION/TRANSFER (TRANSMISSION) SESSION |
| Ks4 | | CELLULAR PHONE | GENERATED FOR EACH REPRODUCTION SESSION |
| Km(i) | PRIVATE DECRYPTION KEY | MEMORY CARD | DECRYPTION KEY UNIQUE TO MEMORY CARD (i). DATA ENCRYPTED WITH KPm(i) IS DECRYPTABLE WITH Km(i). |
| KPm(i) | PUBLIC ENCRYPTION KEY (ASYMMETRIC KEY) | MEMORY CARD | ENCRYPTION KEY UNIQUE TO MEMORY CARD (i) |
| KPma | AUTHENTICATION KEY (PUBLIC DECRYPTION KEY) | DISTRIBUTION SERVER | SHARED THROUGHOUT THE DISTRIBUTION SYSTEM. |
| Kcom | SECRET DECRYPTION KEY | CELLULAR PHONE DISTRIBUTION SERVER | COMMON KEY SHARED BY REPRODUCTION CIRCUITS. FOR USE IN ENCRYPTING AND DECRYPTING Kc, AC2. (APPLICABLE IN ANY OF SYMMETRIC-KEY CRYPTOSYSTEM & PUBLIC-KEY CRYPTOSYSTEM) |

FIG.7

|  | CONTENT ID | LICENSE ID | AC1 Sub_Play | Sub_Move |
|---|---|---|---|---|
| BANK 1 | | | | |
| BANK 2 | | | | |
| BANK 3 | | | | |
| ⋮ | ⋮ | ⋮ | ⋮ | ⋮ |
| BANK N | | | | |

FIG.8

| AC1 | Sub_Play | LIMIT OF NO. OF TIMES OF REPRODUCTION | |
|---|---|---|---|
| | | 0 | : REPRODUCTION DISALLOWED |
| | | 1～7F(h) | : NO. OF TIMES OF REPRODUCTION ALLOWED |
| | | 80～FE(h) | : UNUSED |
| | | FF(h) | : UNLIMITED |
| | Sub_Move | NO. OF LICENSES OWNED | |
| | | 0 | : NO LICENSE |
| | | 1～7F(h) | : NO. OF LICENSES OWNED |
| | | 80～FE(h) | : UNUSED |
| | | FF(h) | : TRANSFER PROHIBITED |

US 7,945,517 B2

DATA DISTRIBUTION SYSTEM AND RECORDING DEVICE FOR USE THEREIN

TECHNICAL FIELD

The present invention relates generally to data distribution systems for distributing information to a terminal such as a cellular phone and particularly to data distribution systems capable of protecting the copyright of copied information and memory cards for use in the systems.

BACKGROUND ART

In recent years the Internet and other similar information communication networks have advanced and a cellular phone or the like is used for a personal terminal to allow the user to readily access network information.

On such an information communication network a digital signal is used to transmit information. As such, if a user copies music, video data or the like transmitted on such an information communication network as described above, each individual user can copy such data almost free of significant degradation in the quality of sound, image and the like.

Thus, if music data, image data or other similar content data in copyright is transmitted on such an information communication network without any appropriate approach taken to protect the copyright, the copyright owner may have his/her right infringed significantly.

However, prioritizing copyright protection and preventing content data distribution on a rapidly expanding digital information communication work, is disadvantageous to copyright owners, who basically can collect a predetermined copyright fee for copying content data.

In contrast, if digital data recorded in a recording medium, e.g., music data recorded in a normally sold compact disc (CD), is copied to a magneto-optical disk (such as an MD), it may be copied, as desired, as long as the copied data is solely for personal use, although an individual user who example digitally records data is required to indirectly pay as a bond to the copyright owner a predetermined portion of the price of the exact digital recording equipment, MD or any other similar media used by the user.

In addition, if music data in a digital signal is copied from a CD to an MD the information is digital data copied without significant degradation and accordingly equipment is configured to prevent copying music data from a recordable MD to another MD and thus protect copyright.

As such, distributing music data, image data and other similar data to the public on a digital information communication network is itself a behavior subject to a restriction attributed to a public transmission right of a copyright owner and a sufficient approach is accordingly required for protection of copyright.

This requires preventing further, arbitrarily copying content data that has been transmitted to the public on an information communication network and received.

DISCLOSURE OF THE INVENTION

One object of the present invention is to provide a data distribution system capable of distributing content data on an information communication network for example of cellular phones, and a recording device for use in the data distribution system, more specifically a memory card.

Another object of the present invention is to provide a data distribution system capable of preventing distributed content data from being replicated without permission of the copyright owner, and a recording device for use in the data distribution system, more specifically a memory card.

In accordance with the present invention a data distribution system includes a plurality of terminals and a data provision device. The data provision device distributes a license key serving as a decryption key for use to decrypt encrypted content data to obtain plaintext content data. The data provision device includes a first interface unit provided to communicate data externally, and a distribution control unit operative, when distribution is requested, to exert control for producing access restriction information and distributing the access restriction information via the first interface unit together with reproduction information at least including a license key. Each terminal includes a second interface unit provided to communicated data externally, a distributed-data deciphering device recording the reproduction information and the access restriction information received from the data provision device via the second interface unit, and a terminal control unit provided for controlling an operation of the terminal. The deciphering device has a storage unit provided to record the reproduction information and the access restriction information therein, and a control unit operative, when the terminal control unit issues a request to output the reproduction information recorded in the storage unit, to refer to the access restriction information in the storage unit to determine whether the reproduction information may be output, when the control unit so determines the reproduction information being output and thereafter as required the control unit changing the access restriction information recorded in the storage unit.

Preferably, each terminal further includes a content data reproduction unit operative, when the terminal control unit issues an instruction to reproduce the content data, to receive the reproduction information from the deciphering device and use the license key to decrypt and reproduce the encrypted content data. The access restriction information includes reproduction control information limiting a frequency of outputting the reproduction information from the deciphering device for use to decrypt the encrypted content data. When an external instruction is issued to reproduce the content data the terminal control unit issues a first request for output instructing the deciphering device to output the reproduction information for use to decrypt the encrypted content data and also instructs the content reproduction unit to reproduce content. When the terminal control unit issues the first request for output the control unit refers to the reproduction control information in the storage unit to determine whether the reproduction information may be output, and when the control unit so determines, the reproduction information is output and thereafter as required the control unit changes the reproduction control information in the storage unit.

Preferably, the access restriction information includes a replication limit information defining a frequency allowed of outputting the reproduction information from the deciphering device to another distributed-data deciphering device. When an external instruction is issued to move the reproduction information the terminal control unit issues a second request for output instructing the deciphering device to output the reproduction information to the another deciphering device. When the terminal control unit issues the second request for output the control unit refers to the replication limit information in the storage unit to determine whether an output may be provided to another deciphering device and when the control unit so determines the reproduction information is output and thereafter as required the control unit changes the replication limit information recorded in the storage unit.

The present data distribution system can hold and update access restriction information on a frequency of reproduction allowed, a number of licenses owned and the like in a distributed-data deciphering unit, more specifically in a memory card, without involving a distribution server. Thus the system can protect the access restriction information against improper changes otherwise introduced from an upper level by means of file systems, application programs and the like. This makes it possible to issue a reproduction circuit's limited reproduction right as reproduction information. Thus, music data (content data) for audition can for example be distributed or sold with a limited frequency of reproduction and hence inexpensively, and, furthermore, a plurality of reproduction rights can be distributed to provide services such as allowing a group to collectively purchase the data. Thus the system can be significantly convenient for users and also ensures a high security level to protect copyright and hence rights of copyright owners.

The present invention in another aspect provides a recording device for storing therein reproduction information for encrypted data containing a license key serving as a decryption key decrypting the encrypted data to obtain plaintext data, including: an interface unit provided to communicate data externally; a storage unit provided to record therein the reproduction information and access restriction information used to control outputting the reproduction information from the recording device; and a control unit operative, when an external instruction is issued to output the reproduction information recorded in the storage unit, to refer to the access restriction information in the storage unit to determine whether the reproduction information may be output, when the control unit so determines the reproduction information being output and thereafter as required the control unit changing the access restriction information recorded in the storage unit.

Preferably, the access restriction information includes reproduction control information limiting a frequency of outputting the reproduction information from the recording device for use to reproduce the encrypted data, and when an external instruction is issued to output the reproduction information for use to reproduce the encrypted data the control unit refers to the reproduction control information in the storage unit to determine whether the reproduction information may be output and if the control unit so determines then the reproduction information is output and thereafter as required the control unit changes the reproduction control information recorded in the storage unit.

Preferably, the access restriction information includes replication limit information limiting a frequency allowed of replication defining a frequency of outputting the reproduction information to another the recording device, and when an external instruction is issued to output the reproduction information to the another recording device the control unit refers to the replication control information in the storage unit to determine whether an output may be provided and when the control unit so determines the reproduction information is output and thereafter as required the control unit changes the replication control information recorded in the storage unit.

The present invention in still another aspect provides a recording device including: an interface unit for externally communicating data; a storage unit for storing therein data storage and access restriction information received through the interface unit, the access restriction information being used to control outputting the data storage from the recording device; an authentication data hold unit holding a first public encryption key determined to correspond to the recording device and encrypted in a state decryptable with an authentication key, for external output via the interface unit when the data storage and the access restriction information are received; a first key hold unit holding a first private decryption key provided to decrypt data encrypted with the first public encryption key; a first decryption unit receiving externally via the interface unit a first symmetric key encrypted with the first public encryption key, and decrypting the first symmetric key; a second key hold unit holding a second public encryption key different for each the recording device; a session key generation unit producing a second symmetric key updated whenever the data storage is communicated; a first encryption unit encrypting the second symmetric key and the second public encryption key with the first symmetric key for output externally via the interface unit; a second decryption unit receiving the data storage and access restriction information input via the interface unit, for decryption with the second symmetric key, the data storage and access restriction information being encrypted with the second symmetric key and the second public encryption key; a third key hold unit holding a second private decryption key provided to decrypt data encrypted with the second public encryption key; a third decryption unit using the second private decryption key to decrypt the data storage and access restriction information encrypted; a control unit operative, when an external instruction is issued to output the data storage recorded in the storage unit, to refer to the access restriction information in the storage unit to determine whether reproduction information for the data storage may be output. The storage unit records therein the data storage in one of a state encrypted with the second public encryption key and a state decrypted by the third decryption unit. When the control unit determines that the data storage may be output the data storage is output and thereafter as required the control unit changes the access restriction information recorded in the storage unit.

The present recording device can hold and store access restriction information such as replication limit information and output frequency control information in a storage region without involving a distribution server. Thus the present device can protect the access restriction information against improper changes otherwise introduced from an upper level by means of file systems, application programs and the like. This makes it possible to issue a reproduction circuit's limited reproduction right. Thus, music data (content data) for audition can for example be distributed or sold with a limited frequency of reproduction and hence inexpensively, and, furthermore, a plurality of reproduction rights can be distributed to provide services such as allowing a group to collectively purchase the data. Thus the present device can be significantly convenient for users and also ensures a high security level to protect copyright and hence lights of copyright owners.

BRIEF DESCRIPTION OF THE DRAWINGS

FIG. 2 is a list of characteristics of data, information and the like used in a data distribution system of a first embodiment for communication.

FIG. 3 is a list of characteristics of key data and the like used in the data distribution system of the first embodiment.

FIG. 7 is a conceptual view for illustrating a configuration of information stored in a license information hold unit.

FIG. 8 illustrates contents of access restriction information AC1.

BEST MODES FOR CARRYING OUT THE INVENTION

Figure 1:
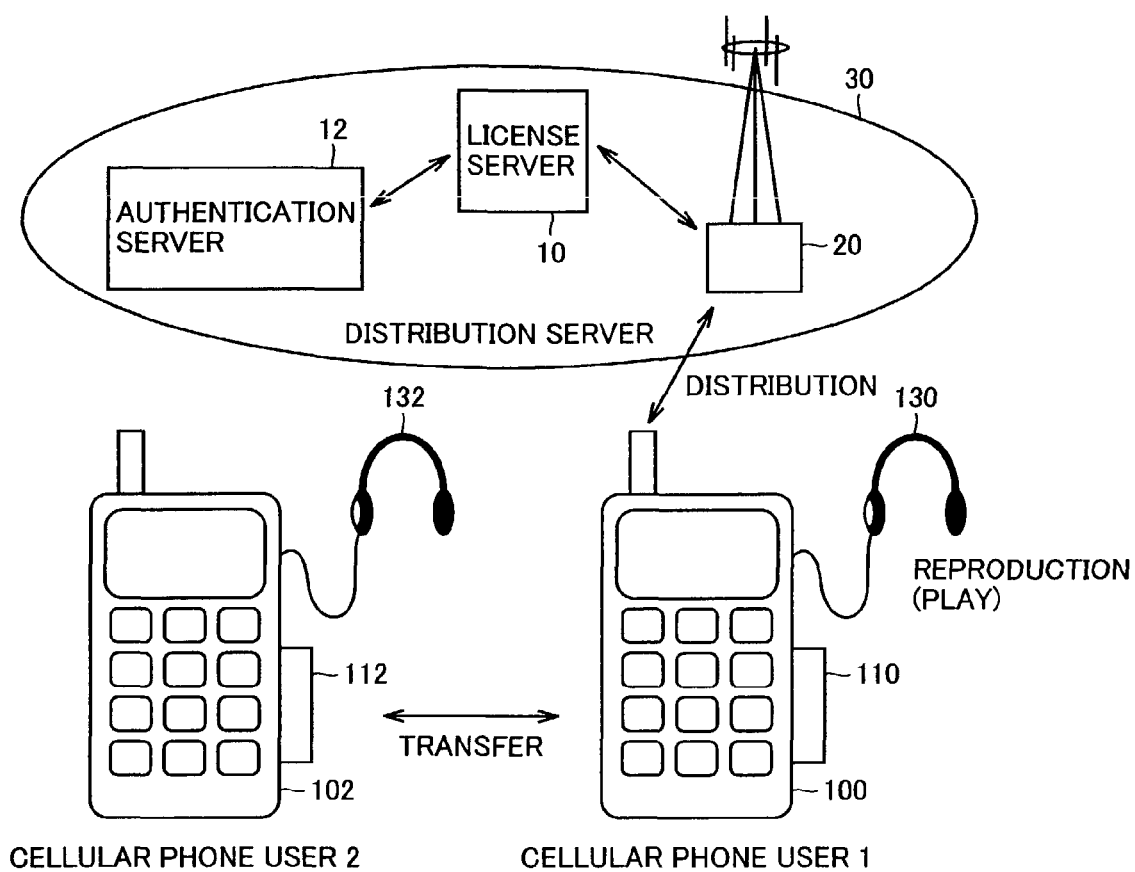
FIG. 1 is a conceptual diagram for illustrating a general configuration of a data distribution system of the present invention.

Hereinafter the data distribution system and recording device according to the embodiments of the present invention will now be described specifically with reference to the drawings. In the figures, like components are denoted by like reference characters.

Note that hereinafter a description will by way of example be provided of a configuration of a data distribution system distributing digital music data to each cellular phone user on a cellular phone work, although, as will be apparent from the following description, the present invention is not limited thereto and it is also applicable to distributing other types of content data, such as image data, video data, teaching-material data, text data, speech (voice) data, game programs and other similar content data, on different information communication networks.

First Embodiment

With reference to FIG. 1, music data in copyright is managed in a license server 10 using a predetermined encryption system to encrypt music data, (hereinafter also referred to as "content data") and feeding such encrypted content data to a cellular phone company corresponding to a distribution carrier 20 for distributing data. An authentication server 12 determines whether a cellular phone, a memory card or the like of a cellular phone user accessing for distribution of music data is authentic equipment.

Distribution carrier 20 receives a distribution request from each cellular phone user and relays it via its cellular phone network to license server 10. License server 10, in response to the distribution request, confirms through authentication server 12 that the cellular phone user is using an authentic cellular phone, memory card and the like and license server 10 further encrypts the requested content data and distributes the encrypted content data via the cellular phone network of distribution carrier 20 to the cellular phone of the cellular phone user.

In FIG. 1, for example a cellular phone user 1 uses a cellular phone 100 with a detachable memory card 110 attached thereto. Memory card 110 receives the encrypted content data received by cellular phone 10 and, in connection with the above described distribution operation, decrypts the encryption and provides the decryption to a music reproduction unit (not shown) provided in cellular phone 100.

Furthermore for example cellular phone user 1 can "reproduce" such content data via a headphone 130 connected to cellular phone 100 and listen to the same.

Hereinafter, such license server 10, authentication server 12 and distribution carrier 20 will generally be referred to as a distribution server 30.

Furthermore, a process of transmitting content data from distribution server 30 for example to each cellular phone will be referred to as "distribution."

As such, first of all, if memory card 110 is not used, content data distributed by distribution server 30 can hardly be received or reproduced as music.

Furthermore, if whenever distribution carrier 20 distributes the content data of a single piece of music the distribution frequency increments and whenever a cellular phone user receives or downloads the content data a copyright fee incurs and it is collected by distribution carrier 20 together with the phone toll of the cellular phone, the copyright owner can readily collect the copyright fee.

Furthermore such distribution of content data is also advantageous as it is provided in a closed system in a form of a cellular phone network, which facilitates developing an approach for copyright protection, as compared with an open system such as the Internet.

In this context, for example a cellular phone user 2 having a memory card 112 can directly receive with his/her cellular phone 102 content data distributed from distribution server 30. If cellular phone user 2 receives directly from distribution server 30 content data or the like having a significant amount of information, however, the data reception may require a relatively long period of time. It would be more convenient for user 2 if the user can copy the content data from cellular phone user 1 having already received the content data distributed from distribution server 30.

As shown in FIG. 1, copying content data from cellular phone user 1 to the cellular phone user 2 equipment together with the exact content data and the information required for allowing the content data to be reproducible, will be referred to as a "replication" of the content data.

In the replication, encrypted content data (music data) and the information required for reproduction (reproduction information) are replicated between memory cards 110 and 112 via cellular phones 100 and 102. Herein, the "reproduction information," as will be described hereinafter, has a license key capable of decrypting content data encrypted in a predetermined encryption system, and limit information on license ID, access reproduction and the like corresponding to the information relating to copyright protection, and other similar information.

Thus, once content data distributed from distribution server 30 is received, it can be used on the receiving side flexibly.

Furthermore, if cellular phones 100 and 102 are personal handy phones (PHSs), they allow communications in the so-called transceiver mode and such a function can thus be used to replicate information between cellular phone users 1 and 2.

In the FIG. 1 configuration, to allow encrypted and distributed content data to be reproduced on the side of a cellular phone user, a system is initially required to be a system for distributing an encryption key in a communication, secondly the exact system encrypting content data to be distributed, and thirdly a configuration implementing decryption key protection for preventing such distributed content data from being copied without permission.

In the present embodiment, in particular when any of distribution, reproduction and replication sessions occurs, whether or not the content data's destination is an authentic destination is determined and checked severely and for any recording devices and content reproduction circuits (cellular phones) that are not authenticated or are with a decryption key broken the system can prevent outputting the content data thereto and thus enhance protection of the copyright of the content data. Furthermore a description will also be provided of a configuration capable of issuing a reproduction right with a limited reproduction frequency to be more convenient for users and also maintain a sufficient copyright security level.

FIG. 2 is a list of characteristics of data, information and the like used in the FIG. 1 data distribution system for a communication.

Initially, data distributed from a distribution server will be described. "Data" is content data such as music data. Content data Data is encrypted, decryptable with a license key Kc. It is encrypted with license key Kc to be encrypted content data {Data} Kc which is in turn distributed from distribution server 30 to a cellular phone user.

Note that hereinafter, a representation {Y} X will refer to data Y encrypted decryptable with a decryption key X.

Furthermore, the distribution server distributes together with the encrypted content data additional information Data-inf corresponding to plaintext information on content data or server access. Furthermore, as the license, there exist a content ID serving as a code for identifying content data Data and a license ID serving as a management code capable of specifying an issuance of a license, and access restriction information AC1 and reproduction circuit control information AC2 generated from license purchasing condition AC including a number of licenses, a limitation on a function and other similar information that are determined as designated by a user. Access restriction information AC1 is information on a limitation imposed on memory access and reproduction circuit control information AC2 is control information in a reproduction circuit.

As will be described hereinafter more specifically, reproduction circuit control information AC2 includes information indicative of a limit of reproduction frequency and a number of licenses allowed to be replicated (transferred) and it is managed and updated in a memory card.

FIG. 3 shows characteristics of a key data and the like used in the FIG. 1 data distribution system.

With reference to FIG. 3, a content reproduction circuit (a cellular phone) and a memory card are provided with public encryption keys KPp(n) and KPmc(m), respectively, unique to their classes. Public encryption keys KPp(n) and KPmc(m) are decryptable with a private decryption key Kp(n) unique to the class of the content reproduction circuit (the cellular phone) and a private decryption key Kmc(m) unique to the class of the memory card, respectively. The public encryption and private decryption keys each have a different value for each cellular phone type and each memory card class.

Furthermore, there are also provided class certificates Cp(n) and Cmc(m) for a memory card and a reproduction circuit, respectively, wherein a natural number m represents a number for distinguishing a class of the memory card and a natural number n represents a number for distinguishing a class of the reproduction circuit.

The public encryption keys and class certificates unique to the memory card and the content reproduction unit are recorded in a memory card and a cellular phone in the form of {KPmc(m)//Cmc(m)}KPma and {KPp(n)//Cp(n)}KPma, respectively, when they are shipped. As will be described hereinafter, KPma represents an authentication key shared throughout a distribution system. When authentication key KPma is used to decrypt authentication data, a result of decrypting the data can be used to verify the authenticity of the authentication data. In other words, authentication key KPma is a key used to approve a public encryption key unique to a class and a class certificate serving as a certificate thereof. Note that authentication data is created through an encryption process using an asymmetric private key paired with the authentication key.

When a memory card externally communicates data, encryption keys Ks1-Ks4 are used to keep the secret. Keys Ks1-Ks4 are symmetric keys generated by server 30, cellular phone 100 or 102, memory card 110 or 112 whenever content data is distributed, reproduced and replicated.

Herein, symmetric keys Ks1-Ks4 are unique symmetric keys generated for each "session" corresponding to a unit of communication or a unit of access between a server, a cellular phones and a memory cards and hereinafter will also be referred to as "session keys."

Session keys Ks1-Ks4 each have a unique value for each communication session and thus managed by a distribution server, a cellular phone and a memory card. More specifically, session key Ks1 is generated by the distribution server for each distribution session. Session key Ks2 is generated by the memory card for each distribution session and each replication (on a receiving side) session, and session key Ks3 is generated similarly in the memory card for each reproduction session and each replication (on a transmitting side) session. Session key Ks4 is generated in the cellular phone for each reproduction session. In each session, these session keys can be communicated at a session key generated by other equipment can be received and used to effect encryption and a license key and the like can then be transmitted to enhance security in the session.

Furthermore, as a key for managing a data-processing in memory card 100, there exist a public encryption key KPm(i) set for each medium corresponding to a memory card and a private decryption key Km(i) each unique each memory card and capable of decrypting data encrypted with encryption key KPm (i), wherein i represents a natural number. Herein, natural number i represents a number provided to distinguish each memory card.

Furthermore, as a common secret key in a system there exists a secret key Kcom in a symmetric-key cryptosystem used mainly to obtain license key Kc. Secret key Kcom is held in both of a distribution server and a cellular phone and used to encrypt license key Kc and decrypt and thus obtain the same, respectively.

Note that symmetric key Kcom may be replaced by a set of public encryption key KPcom and private decryption key Kcom in a public-key cryptosystem. In this case, public encryption key KPcom is held in a distribution server and used to encrypt license key Kc and private decryption key Kcom is held in a cellular phone and used to obtain license key Kc.

Figure 4:
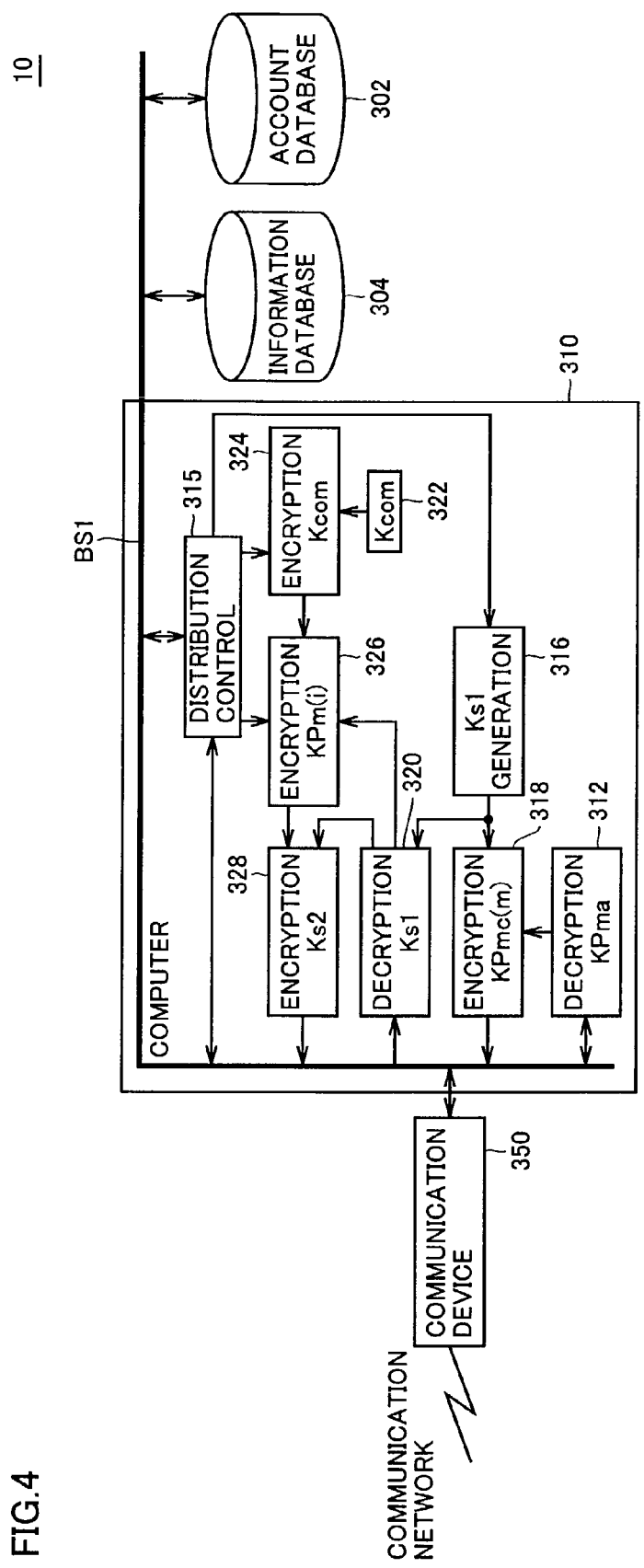
FIG. 4 is a schematic block diagram showing a configuration of the FIG. 1 license server.

With reference to FIG. 4, license server 10 includes an information database 304 provided to hold content data encrypted in a predetermined system, information on distribution for example of a license ID and the like, an account database 302 provided to hold account information for each cellular phone user starting an access to content data, a data processing unit 310 receiving data from information database 304 and account database 302 on a data bus BS1 and processing the received data, as predetermined, and a communication device 350 communicating data between distribution carrier 20 and data processing unit 310 on a communication network.

Data processing unit 310 includes a distribution control unit 315 receiving data on data bus BS1 and accordingly controlling an operation of data processing unit 310, a session key generation unit 316 controlled by distribution control unit 315 to generate session key Ks1 in a distribution session, a decryption unit 312 receiving via communication device 350 and on data bus BS1 authentication data {KPmc(m)//HCmc(m)}KPma and {KPp(n)//Cp(n)}KPma for authentication that are transmitted from a memory card and a cellular phone, and decrypting the received data with authentication key KPma.

Data processing unit 310 further includes an encryption unit 318 encrypting session key Ks1 generated by session key generation unit 316, with public encryption key KPmc(m) obtained by decryption unit 312, for output on data bus BS1, a decryption unit 320 receiving and decrypting data encrypted with session key Ks1 and then transmitted on data bus BS1, and a Kcom hold unit 322 holding secret key Kcom shared by reproduction circuits.

Data processing unit 310 further includes an encryption unit 324 using secret key Kcom to encrypt license key Kc and reproduction circuit control information AC2 received from distribution control unit 315, an encryption unit 326 encrypting data received from encryption unit 324 with public encryption key KPm(i) obtained by decryption unit 320 and unique to a memory card, and an encryption unit 328 further encrypting an output of encryption unit 326 with session key Ks2 received from decryption unit 320, for output on data bus BS1.

Note that if private decryption Kcom in a symmetric-key cryptosystem is replaced by a set of public encryption key KPcom and private decryption key Kcom in a public-key cryptosystem, a component corresponding to Kcom hold unit 322 holds public encryption key KPcom and encryption unit 324 uses public encryption key KPcom to effect encryption.

License server 10 in a distribution session operates, as will later be described with reference to a flow chart.

Figure 5:
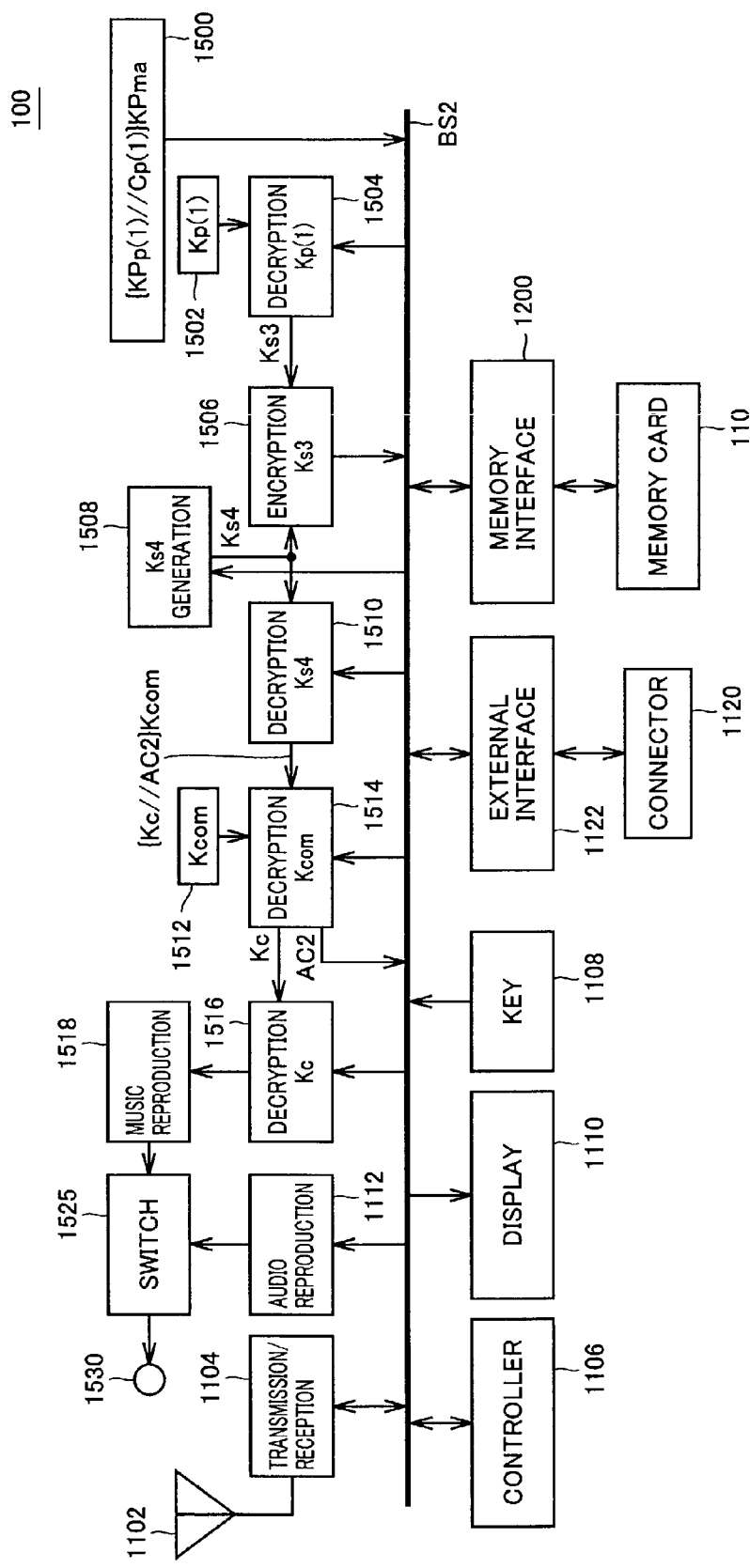
FIG. 5 is a schematic block diagram showing a configuration of the FIG. 1 cellular phone.

With reference to FIG. 5, cellular phone 100 has a class represented by natural number n=1 and it is individually identified by natural number i=1.

Cellular phone 100 includes an antenna 1102 receiving a signal transmitted on a cellular phone network by wireless, a transmission and reception unit 1104 receiving a signal from antenna 1102 and converting the received signal to a baseband signal or modulating data received from the cellular phone and providing the modulated data to antenna 1102, a data bus BS2 allowing data communication between components of cellular phone 100, and a controller 1106 controlling an operation of cellular phone 100 via data bus BS2.

Cellular phone 100 further includes a key unit 1108 having keys pressed to input an external instruction to cellular phone 100, a display 1110 presenting information output for example from controller 1106 to a cellular phone user visibly, an audio reproduction unit 1112 operative in a normal conversation operation to reproduce speech based on data received on database BS2, a connector 1120 provided to allow external data communication, an external interface 1122 converting data received from connector 1120 into a signal that can be provided on data bus BS2, or converting data received on data bus BS2 into a signal that can be provided to connector 1120.

Cellular phone 100 further includes a detachably attachable memory card 110 storing and decrypting content data (music data) received from distribution server 30, a memory interface 1200 controlling data communication between provided memory card 110 and data bus BS2, and an authentication data hold unit 1500 holding data encrypted authenticatable when public encryption key KPp(1) and class certificate Cp(1) set for each cellular phone class are decrypted with authentication key KPma.

Cellular phone 100 further includes a Kp hold unit 1502 holding private decryption key Kp(1) unique to the cellular phone (the content reproduction circuit), a decryption unit 1504 using Kp(1) to decrypt data received on data bus BS2, and obtaining session key Ks3 generated by the memory card, a session key generation unit 1508 using a random number or the like to generate session key Ks4 for encrypting data communicated with memory card 110 on data bus BS2 in a reproduction session reproducing content data stored in memory card 110, an encryption unit 1506 using session key Ks3 obtained by decryption unit 1504, to encrypt generated session key Ks4 for output on data bus BS2, and a decryption unit 1510 using session key Ks4 to decrypt data on data bus BS2 for output.

Cellular phone 100 further includes a Kcom hold unit 1512 holding secret key Kcom set to be shared by reproduction circuits, a decryption unit 1514 using secret key Kcom to decrypt {Kc//AC2}Kcom output from decryption unit 1510, and outputting license key Kc and reproduction circuit control information AC2, a decryption unit 1516 receiving encrypted content data {Data}Kc on data bus BS2, decrypting the received data with license key Kc obtained from decryption unit 1514, and outputting content data. Cellular phone 100 also includes a music reproduction unit 1518 receiving an output of decryption unit 1516 and reproducing content data, a switch unit 1525 receiving and selectively outputting an output of music reproduction unit 1518 and that of audio reproduction unit 1112 for different modes of operation, and a connection terminal 1530 receiving and connecting an output of switch unit 1525 to a headphone 130.

Note that if symmetric key Kcom is replaced by a set of public encryption key KPcom and private decryption key Kcom in a public-key cryptosystem, a component corresponding to Kcom hold unit 1512 holds private decryption key Kcom and decryption unit 1514 uses private decryption key Kcom to provide decryption.

Note that for the purpose of simplifying the description, FIG. 5 only shows a cellular phone at a block relating to distribution and reproduction of content data in accordance with the present invention. The cellular phone of course has a block relating to conversation, which is only partially described herein.

In FIG. 5 it is the blocks other than those relating to or also operating in a telephone conversation process, i.e., antenna 1102, transmission and reception unit 1104, controller 1106, keyboard 1108, display 1110, audio reproduction unit 1112, connector 1120, external interface 1122, switch unit 1525 and connection terminal 1530 that correspond to the content reproduction unit relating to distributing and reproducing content data. Note that cellular phone 100 may have the block group corresponding to the content reproduction unit that is configured in the form of a detachably attached music reproduction module to be more convenient for cellular phone users.

In cellular phone 100 each component operates in each session, as will later be described more specifically with reference to a flow chart.

Figure 6:
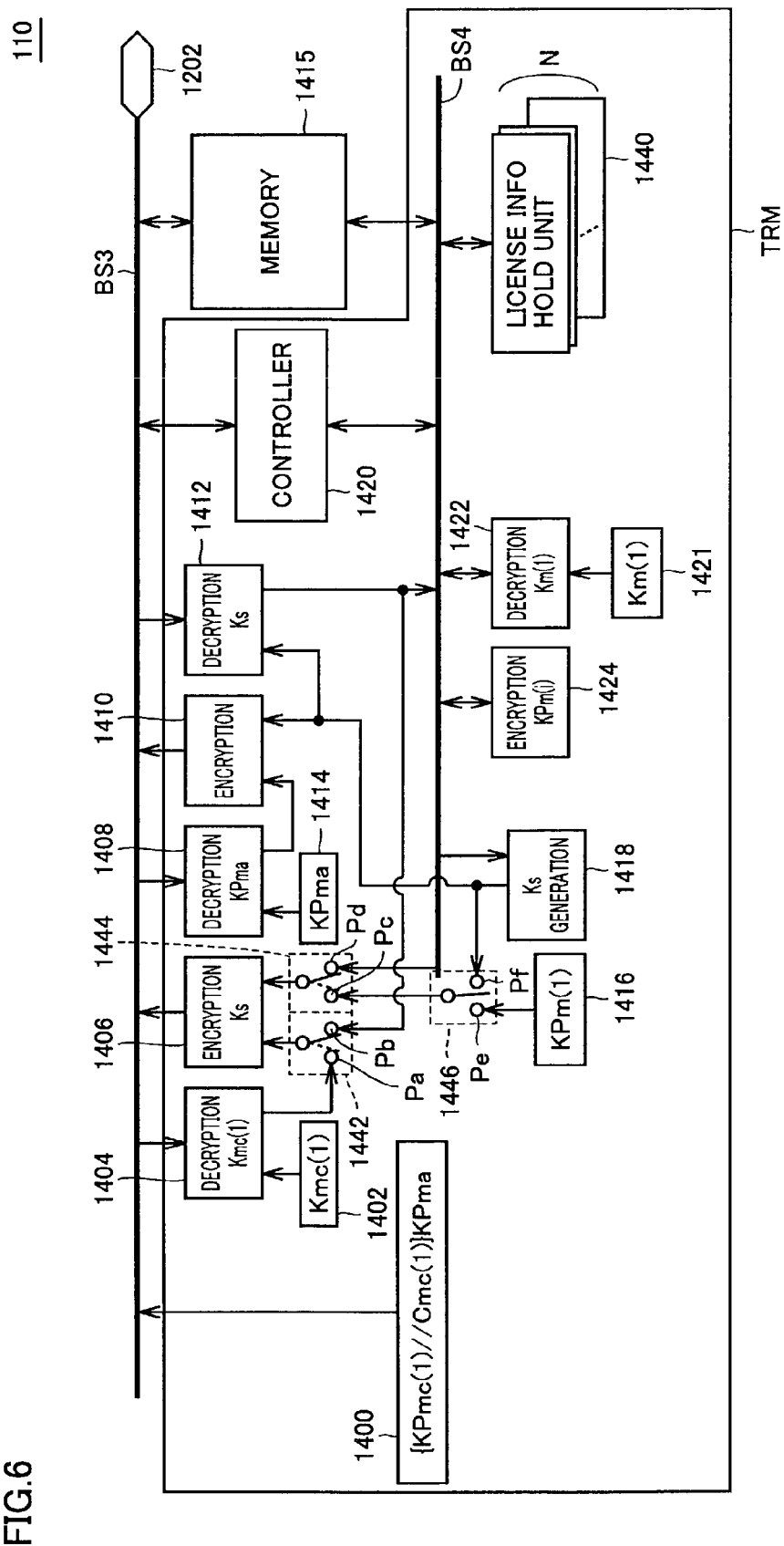
FIG. 6 is a schematic block diagram showing a configuration of the FIG. 5 memory card.

With reference to FIG. 6, as has been described previously, public encryption key KPm(i) and private decryption key Km(i) corresponding thereto each have a value unique to each memory card and for memory card 110 natural number i=1 for the sake of convenience. Furthermore there are also provided public encryption key KPmc(m), private decryption key Kmc(m) and a memory card class certificate Cmc(m) unique to each memory card, and for memory card 110 natural number m=1 for the sake of convenience.

Memory card 110 includes an authentication data hold unit 1400 holding authentication data {KPmc(1)//Cmc(1)}KPma, a Kmc hold unit 1402 holding a unique decryption key Kmc (1) set for each memory card, a Km(1) hold unit 1421 holding private decryption key Km(1) set unique to each memory card, and a KPm(1) hold unit 1416 holding public encryption key KPm(1) decryptable with Km(1). Authentication data hold unit 1440 encrypts and holds public encryption key KPmc(1) set for memory card 110. In doing so, it encrypts the key in a state authenticatable when the key is decrypted with authentication key KPma.

By thus providing a public encryption key of a recording device corresponding to a memory card, distributed content data, an encrypted license key and the like can be managed for each memory card.

Memory card 110 further includes a data bus BS3 communicating a signal with memory interface 1200 via a terminal 1202, a decryption unit 1404 receiving data on data bus BS3 via memory interface 1200 and private decryption key Kmc (1) unique to each memory card type from Kmc(1) hold unit 1402, and outputting to a contact Pa session key Ks1 generated by distribution server 30 in a distribution session or session key Ks3 generated by a different memory card in a replication session.

Memory card 110 also includes a decryption unit 1408 receiving authentication key KPma from KPma hold unit 1414 and using authentication key KPma to provide a decryption process based on data received on data bus BS3, and outputting to encryption unit 1410 a result of the decryption, and an encryption unit 1406 using a key selectively provided via switch 1442, to encrypt data selectively provided via switch 1444, for output on data bus BS3.

Memory card 110 further includes a session key generation unit 1418 generating session key in each of distribution, reproduction and replication sessions, a encryption unit 1410 encrypting session key Ks3 output from session key generation unit 1418, with public encryption key KPp(n) or KPmc (m) obtained by decryption unit 1408, for output on data bus BS3, and a decryption unit 1412 receiving the data on BS3 encrypted with session key Ks3, decrypting the received data with session key Ks3 obtained from session key generation unit 1418, and outputting a result of the decryption on data bus BS4.

Memory card 110 further includes an encryption unit 1424 operative in "replication" to encrypt data on data bus BS4 with public encryption key KPm(i) of another memory card, wherein i≠1, a decryption unit 1422 decrypting data on data bus BS4 with private decryption key Km(1) unique to memory card 110 and paired with public encryption key KPm(1), and a memory 1415 receiving and storing therein license key Kc and reproduction circuit control information AC2 encrypted with public encryption key KPm(1) and transmitted on data bus BS4, and receiving and storing therein encrypted content data {IData}Kc and additional information Data-inf transmitted on data bus BS3.

Memory card 110 further includes a license information hold unit 1440 holding a license ID, a content ID and access restriction information AC1 obtained by decryption unit 1422, and a controller 1420 communicating data externally on data bus BS3 and receiving reproduction information and the like on data bus BS4 to control an operation of memory card 110. License information hold unit 1440 is capable of communicating data of a license ID, a content ID and access restriction information AC1 on data bus BS4.

With reference to FIG. 7, license information hold unit 1440 has N banks, wherein N represents a natural number, and holds for each bank the license information corresponding to each license, i.e., a license ID, data content ID data and access restriction information AC1.

With reference to FIG. 8, access restriction information AC1 includes reproduction frequency limit information Sub_Play and a number of license owned Sub_Move. In FIG. 8, reproduction frequency limit information Sub_Play is for example 8-bit data. Sub_Play having a value of FF(h) indicates that a reproduction frequency has no limit and Sub_Play having a value of 0(h) indicates that reproduction is no longer possible. Furthermore, if Sub_Play has a value in a range of 1(h) to 7F(h) then the value indicates a number of times of reproduction allowed and whenever reproduction is effected the value of Sub_Play is reduced. Note that (h) is in hexadecimal representation.

Furthermore, in FIG. 8, the number of licenses owned Sub_Move is represented similarly in 8-bit data by way of example. Sub_Move having a value of FF(h) indicates that replication is prohibited. Furthermore, if Sub_Move has a value in a range of 0(h) to 7F(h) the value indicates a number of licenses owned and whenever replication to another memory card is effected the value of Sub_Move is reduced to reflect the number of licenses replicated and when the value attains 0(h) it indicates that there is no more license for replication.

Access restriction information AC1 is issued by distribution server 30 in a distribution operation according to license purchasing condition AC produced, as designated by a user when a license is purchased, and it is updated and held in memory card 110 whenever reproduction and replication operations are effected.

Note that in FIG. 6, the portion surrounded by a solid line is adapted to be incorporated in memory card 110 at a module TRM so that for example when it is externally, improperly opened, internal data is erased or internal circuitry is destroyed to prevent a third party from reading for example data in a circuit existing in the portion surrounding by the solid line. Such a module is typically an externally directly in access for tamper resistant module, a module inaccessible directly from outside, employing a technique mechanically and logically preventing internal analysis, improper changes, and the like.

Of course memory 1415 may also together be incorporated into module TRM, although in the FIG. 6 configuration, with memory 1415 holding reproduction information required for reproduction, all in the form of encrypted data, a third party merely having the data in memory 1415 cannot reproduce music, and furthermore it is not necessary to arrange memory 1415 in the expensive tamper resistance module and the production cost can thus be reduced.

In the present embodiment the data distribution system operates in each session, as will now be described more specifically with reference to a flow chart.

Initially the FIGS. 9 and 10 flow chart will be referred to to describe an operation in a distribution session (hereinafter also referred to as a distribution operation) provided in purchasing content in the data distribution system of the first embodiment.

Figure 9:
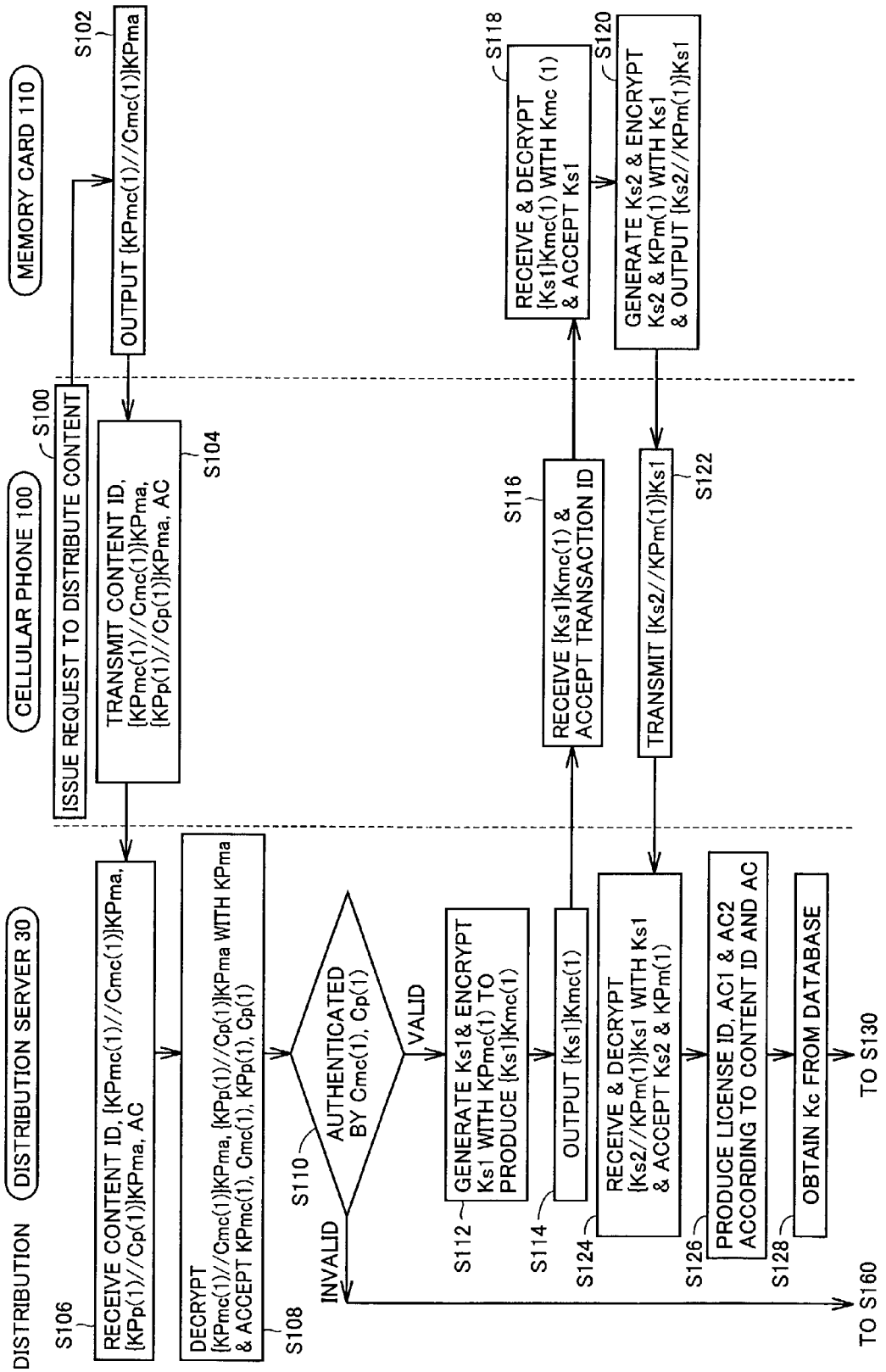
FIGS. 9 and 10 are first and second flow charts, respectively, for illustrating an operation of the data distribution system of the first embodiment in a distribution session.
Figure 10:
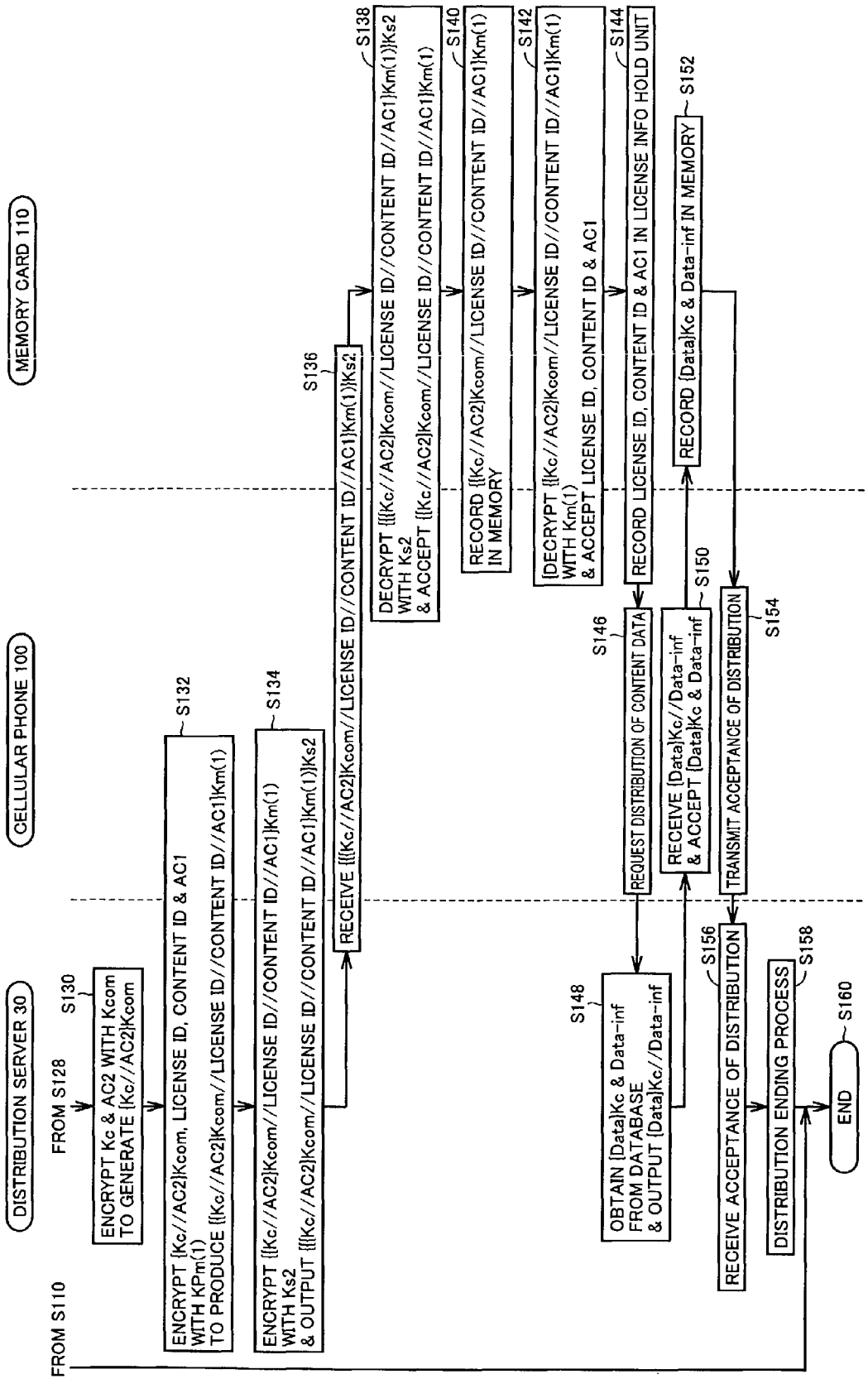

In FIGS. 9 and 10 is described an operation when cellular phone user 1 uses memory card 110 to receive via cellular phone 100 content data corresponding to music data distributed from distribution server 30.

With reference to FIG. 9, cellular phone user 1 of cellular phone 100 for example presses a key button on key unit 1108 to issue an request to distribute data (step S100).

In memory card 110 responds to the distribution request by allowing authentication data hold unit 1400 to output authentication data {KPmc(1)//Cmc(1)}KPma (step S102).

Cellular phone 100 transmits authentication data {KPmc(1)//Cmc(1)}KPma received from memory card 110 for authentication, as well as authentication data {KPp(1)//Cp(1)} KPma for authentication of a content reproduction circuit, a content ID and license purchasing condition data AC to distribution server 30 (step S104).

Distribution server 30 receives the content ID, authentication data {KPp(1)//Cp(1)}KPma, {KPmc(1)//Cmc(1)}KPma, {KPp(1)//Cp(1)}KPma and license purchasing condition AC from cellular phone 100 (step S106), in decryption unit 312 effects decryption with authentication key KPma, and receives public encryption key and class certificates KPmc(1) and Cmc(1) of memory card 110 and public encryption key and class certificates KPp(1) and Cp(1) of the content reproduction circuit of cellular phone 100 (step S108).

Distribution control unit 315 sends to authentication server 12 a query based on class certification data Cmc(1) and Cp(1) received and if these class certificates are valid the equipment of interest is proper equipment it is confirmed that the public encryption keys are valid, and the control then moves on to a subsequent step (step S112). If the public encryption keys are invalid the process ends (step S160) (step S110).

Since authentication data {KPmc(1)}KPma and {KPp(1)} KPma are encrypted such that their authenticities can be determined when they are decrypted with authentication key KPma, distribution control unit 315 of license server 10 may be adapted to uniquely provide authentication from a result of decryption, rather than sending a query to authentication server 12.

If a query reveals that a cellular phone having a memory card and a reproduction circuit with proper class certificates is demanding an access then in distribution server 30 session key generation unit 316 produces session key Ks1 for distribution. Session key Ks1 is encrypted by encryption unit 318 using public encryption key KPmc(1) obtained by decryption unit 312 and corresponding to memory card 110 (step S112).

Encrypted session key Ks1 is externally output as {Ks1}Kmc (1) on data bus BS1 and via communication device 350 (step S114).

When cellular phone 100 receives encrypted session key {Ks1}Kmc (1) (step S116), in memory card 110 the received data received via memory interface 1200 and transmitted on data bus BS3 is decrypted by decryption unit 1404 using private decryption key Kmc(1) held in hold unit 142 and unique to memory card 110 and session key Ks1 is thus decrypted and extracted (step S118).

When controller 1420 confirms that session key Ks1 generated by distribution server 30 has accepted, it instructs session key generation unit 1418 to generate session key Ks2, which a memory card generates in a distribution operation.

Encryption unit 1406 uses session key Ks1 received from decryption unit 1404 via a contact Pa of switch 1442, to encrypt session key Ks2 and public encryption key KPm(1) provided via switches 1444 and 1446 having their respective contacts switched successively and provide them in a series of data and output {Ks2//KPm(1)}Ks1 on data bus BS3 (step S120).

Encrypted data {Ks2//KPm(1)}Ks1 output on data bus BS3 is output therefrom via terminal 1202 and memory interface 1200 to cellular phone 100 and transmitted from cellular phone 100 to distribution server 30 (step S122).

Distribution server 30 receives encrypted data {Ks2//KPm(1)}Ks1, in decryption unit 320 decrypts the data with session key Ks1, and accepts session key Ks2 generated in memory card 110 and public encryption key Kpm(1) unique to memory card 110 (step S124).

Furthermore, distribution control unit 315 generates a license ID, access restriction information AC1 and reproduction circuit control information AC2 according to content ID and license purchasing condition AC obtained at step S106 (step S126). Furthermore it obtains license key Kc from information database 304 to decrypt encrypted content data (step S128).

With reference to FIG. 10, distribution control unit 315 provides obtained license key Kc and reproduction circuit control information AC2 to encryption unit 324, which in turn encrypts license key Kc and reproduction circuit control information AC2 with secret key Kcom shared by reproduction circuit and obtained from Kcom hold unit 322 (step S130).

Encrypted data {Kc//AC2}Kcom output from encryption unit 324, and the license ID, content ID and access restriction information AC1 output from distribution control unit 315 are encrypted by encryption unit 326 using public encryption key KPm(1) obtained by decryption unit 320 and unique to memory card 110 (step S132). Encryption unit 328 receives an output of encryption unit 326 and encrypts it with session key Ks2 generated in memory card 110. Encryption unit 328 outputs the encrypted data which is in turn transmitted on data bus BS1 and via communication device 350 to cellular phone 100 (step S134).

Thus, a distribution server and a memory card generate encryption keys, respectively, mutually communicate the encryption keys, use them to effect encryption, and mutually transmit the encrypted data. Thus in transmitting and receiving their respective encrypted data a mutual authentication can in effect also be achieved to enhance the security of the data distribution system.

Cellular phone 100 receives encrypted data {{{KC//AC2}Kcom//license ID//content ID//AC1}Km(1)}Ks2 transmitted (step S136) and in memory card 110 decryption unit 1412 decrypts data transmitted via memory interface 120 and on data bus BS3. Decryption unit 1412 uses session key Ks2 received from session key generation unit 1418 to decrypt the received data on data bus BS3 for output on data bus BS4 (step S138).

Output at this stage on data bus BS4 are {{KC//AC2}Kcom//license ID//content ID//AC1}Km(1) decryptable with private decryption key Km(1) held in Km(1) hold unit 1421. According to an instruction from controller 1420, {{KC//AC2}Kcom//license ID//content ID//AC1}Km (1) is recorded in memory 1415 (step S140). On the other hand, {{KC//AC2} Kcom//license ID//content ID//AC1}Km(1) is decrypted by decryption unit 1422 using private decryption key Km(1), and only a license ID, a content ID and access restriction information AC1 are accepted (step S142).

The license ID, the content ID and access restriction information AC1 are recorded in license information hold unit 1440 (step S144).

When the process up to step S144 normally completes in a memory circuit, cellular phone 100 sends a request to distribution server 30 to distribute content data (step S146).

Distribution server 30 receives the content data distribution request, obtains encrypted content data {Data}Kc and additional information Data-inf from information database 340 and outputs these data on data bus BS1 and via communication device 350 (step S148).

Cellular phone 100 receives {Data}Kc//Data-inf and accepts encrypted content data {Data}Kc and additional information Data-inf (step S150). Encrypted content data {Data}Kc and additional information Data-inf are transmitted via memory interface 1200 and terminal 1202 to data bus BS3 of memory card 110. Memory card 110 records the received {Data}Kc and additional information Data-inf in memory 1415 as they are (step S152).

Furthermore, memory card 110 transmits to distribution server 30 a notification that the distribution has been accepted (step S154) and when distribution server 30 receives the notification (step S156) a process to complete the distribution is carried out including e.g., storing account data to account database 302 (step S158) and the entire process ends (step S160).

Thus the content reproduction unit of cellular phone 100 and memory card 110 are confirmed as proper equipment and public encryption keys Kp(1) and Kmc(1) successfully encrypted and transmitted together with class certificates Cp(1) and Cmc(1), respectively, are also confirmed valid, and only then can content data be distributed and a sufficient security level can thus be ensured.

Figure 11:
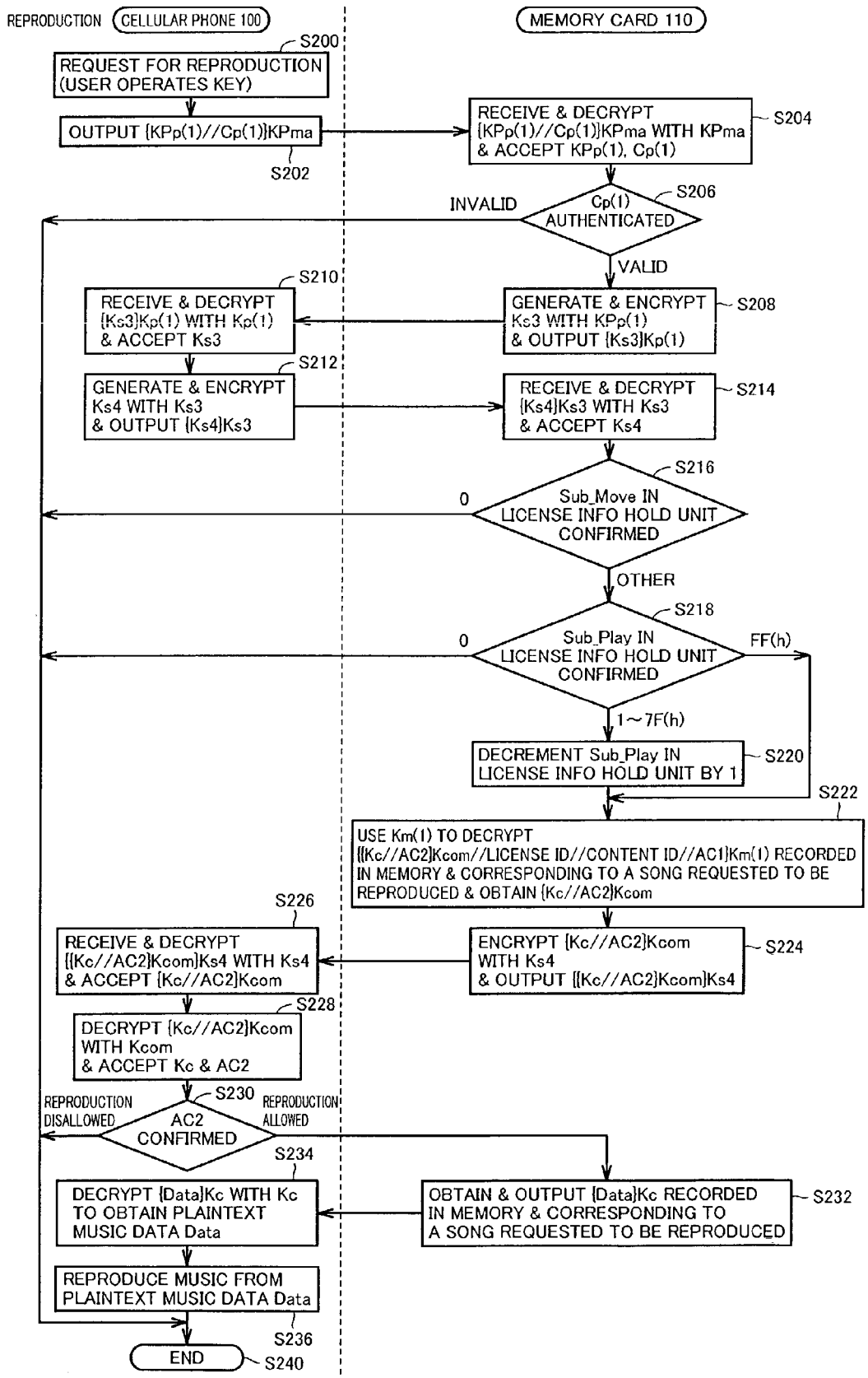
FIG. 11 is a flow chart for illustrating an operation in a reproduction session according to the first embodiment.

Reference will now be made to FIG. 11 to describe an operation in a reproduction session (hereinafter also referred to as a reproduction operation) provided in cellular phone 100 to reproduce music from encrypted content data held in memory card 110 and externally output the music.

With reference to FIG. 11, cellular phone user 1 inputs an instruction to a cellular phone via a key unit 1108 having keys pressed to generate a request for reproduction (step S200). In response to the reproduction request being generated, in cellular phone 100 authentication data hold unit 1500 outputs on data bus BS2 authentication data {Pp(1)//Cp(1)}KPma, which is authenticatable when it is decrypted with authentication key KPma (step S202).

Authentication data {KPp(1)//Cp(1)}KPma is transmitted on data bus BS2 and via memory interface 1200 to memory card 110.

In memory card 110, encrypted data {KPp(1)//Cp(1)}KPma for authentication, transmitted via terminal 1202 and on data bus BS3, is taken in by decryption unit 1408, which receives authentication key KPma from KPma hold unit 144 and decrypts the data on data bus BS3 to obtain public encryption key KPp(1) and class certificate Cp(1)unique to the content reproduction unit or the type of cellular phone 100. Controller 1420 accepts public encryption key KPp(1) and class certificate Cp(1) on data bus BS3 (step S204).

Controller 1420 receives a result of decrypting data in decryption unit 1408 and uses it to effect an authentication process for the content reproduction circuit of cellular phone 100 accepted and if the content reproduction circuit of cellular phone 100 is an approved circuit then the control moves on to a subsequent step S208 (step S206). If not then the reproduction session process ends (step S240).

Then controller 1420 issues an instruction to session key generation unit 1418 on data bus BS4 to generate session key Ks3 in the reproduction session. Session key Ks3 thus generated is transmitted to encryption unit 1410. Encryption unit 1410 encrypts session key Ks3 with public encryption key KPp(1) of cellular phone 100 obtained by decryption unit 1408, and outputs on data bus BS3 encrypted data {Ks3}Kp(1) decryptable with private decryption key Kp(1) corresponding to public encryption key KPp(1) (step S208).

Cellular phone 100 receives encrypted data {Ks3}Kp(1) on data bus BS via terminal 1202 and memory interface 1200. Encrypted data {Ks3}Kp(1) is decrypted by decryption unit 1504 and session key Ks3 generated in memory card 110 is accepted (step S210).

In response to the acceptance of session key Ks3, controller 1106 issues an instruction to session key generation unit 1508 on data bus BS2 to generate session key Ks4, which is produced by cellular phone 100 in a reproduction session. Session key Ks4 thus produced is transmitted to encryption unit 1506 and session key Ks3 obtained by decryption unit 1504 is used to provide encryption {Ks4}Ks3 which is in turn transmitted on data bus BS2 (step S212).

Encrypted session key {Ks4}Ks3 is transmitted via memory interface 1200 to memory card 110, in which encrypted session key {Ks4}Ks3 is transmitted on data bus BS3 and decrypted by decryption unit 1412 and session key Ks4 generated by cellular phone 100 is accepted (step S214).

In response to the acceptance of session key Ks4, controller 1420 confirms the corresponding access restriction information AC1 existing in license information hold unit 1440.

Controller 1420 initially confirms a number of licenses owned Sub_Move and if it has a value of 0 it means that there is no longer any license and the control terminates the reproduction session (step S240). If value Sub_Move has a value other than 0 then the control moves on to a subsequent step (step S216).

In the subsequent step, controller 1420 confirms reproduction frequency limit information Sub_Play and if it has a value of 0 it indicates that reproduction is not longer possible and the control terminates the reproduction session (step S240). If reproduction frequency limit information Sub_Play has a value in a range of 1(h) to 7F(h) then the control decrements by one the Sub_Play value or number of times of reproduction allowed (step S220) and proceeds with the process of the reproduction session. If reproduction frequency limit information Sub_Play has a value of FF(h) it indicates that the license of the interest can be reproduced as many times as desired and without executing step S220 the control effects the process of the reproduction session (step S218).

If at step S218 the control determines that reproduction is possible in the reproduction session of interest, then a decryption process is effected to decrypt license key Kc and reproduction circuit control information AC2 recorded in memory and associated with a song requested to be reproduced. More specifically, in response to an instruction from controller 1420, encrypted reproduction information {{Kc//AC2}Kcom//license ID//content ID//AC1}Km (1) read from memory 1415 onto data bus BS4 is decrypted by decryption unit 1422 using private decryption key Km(1) unique to memory card 110 and encrypted data {Kc//AC2}Kcom decryptable with common secret key Kcom is obtained on data bus BS4 (step S222).

Obtained encrypted data {Kc//AC2}Kcom is transmitted via a contact Pd of switch 1444 to encryption unit 1406, which in turn further encrypts encrypted data received on data bus BS4, with session key Ks4 received from decryption unit 1412 via contact Pb of switch 1442, and outputs {{Kc//AC2}Kcom}Ks4 on data bus BS3 (step S244).

The encrypted data output on data bus BS3 is transmitted via memory interface 1200 to cellular phone 100.

Encrypted data {{Kc//AC2}Kcom}Ks4 received by cellular phone 100 via memory interface 1200 is transmitted on data bus BS2 and decrypted by decryption unit 1510 and encrypted license key Kc and reproduction circuit control information AC2 are accepted (step S226).

Decryption unit 1514 decrypts encrypted data {Kc//AC2}Kcom with secret key Kcom received from Kcom hold circuit 1512 and shared by reproduction circuits to accept license key Kc and reproduction circuit control information AC2 (step S228). Decryption unit 1514 transmits license key Kc to decryption unit 1516 and outputs reproduction circuit control information AC2 on data bus BS2.

Controller 1106 accepts reproduction circuit control information AC2 on data bus BS2 and confirms whether reproduction is allowed (step S230).

If at step S230 the control determines from reproduction circuit control information AC2 that reproduction is disallowed, the reproduction session ends (step S240). If reproduction is allowed, memory card 110 outputs on data bus BS3 encrypted content data {Data}Kc recorded in memory and corresponding to a requested song, and the data is transmitted via memory interface 1200 to cellular phone 100 (step S232).

Encrypted content data {Data}Kc output from memory card 210 and received by cellular phone 100 is transmitted on data bus BS2 and decrypted by decryption unit 1516 using license key Kc to obtain plaintext content data Data (step S234). The decrypted, plaintext content data Data is converted by music reproduction unit 1518 into a music signal (step S236) and the reproduced music is output externally via a mixing unit 1525 and a terminal 1530. Thus the process ends (step S240).

Thus on the side of memory card 110 cellular phone 100 corresponding to a content reproduction circuit can be subjected to an authentication process and then prohibited from a reproduction process. Furthermore a reproduction operation can be effected to reflect the access restriction information updated and held in the memory card.

In a reproduction session, cellular phone 100 and memory card 110 also generate encryption keys, respectively, mutually communicate the encryption keys, effect encryption with their respectively received encryption keys, and mutually transmit the encrypted data. Thus, in the reproduction session, as well as a distribution session, in their respectively transmitting and receiving data a mutual authentication can also in effect be achieved to enhance the security of the data distribution system.

Reference will now be made to the FIGS. 12, 13 and 14 flowcharts to describe an operation in a replication session (hereinafter also referred to as a replication operation) replicating content data between two memory cards FIGS. 12, 13 and 14 describes an operation replicating content data, key data and the like between two memory cards 110 and 112 via cellular phones 100 and 102.

Figure 12:
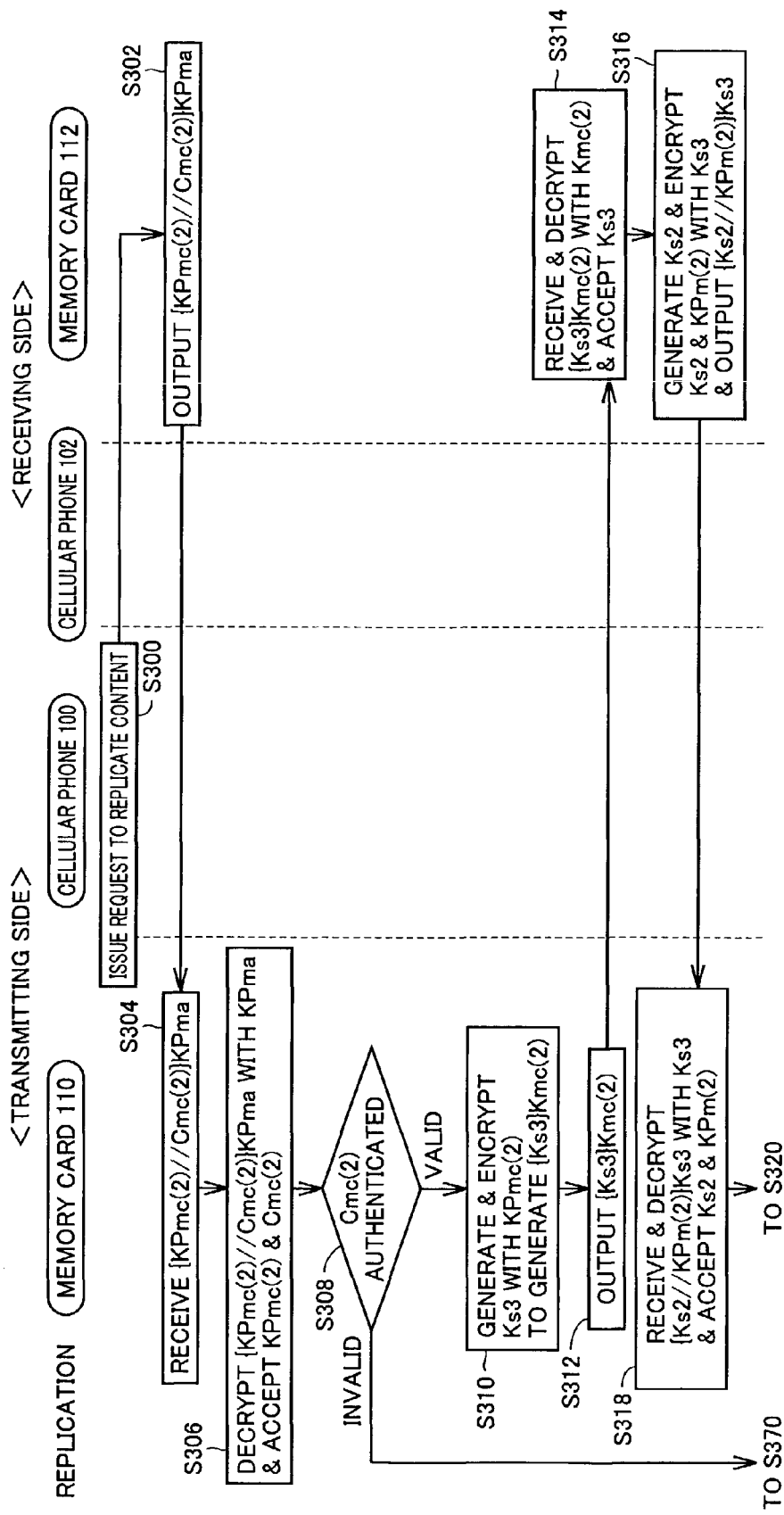
FIGS. 12, 13 and 14 are first, second and third flow charts, respectively, for illustrating an operation in a replication session between two cards in the first embodiment.
Figure 13:
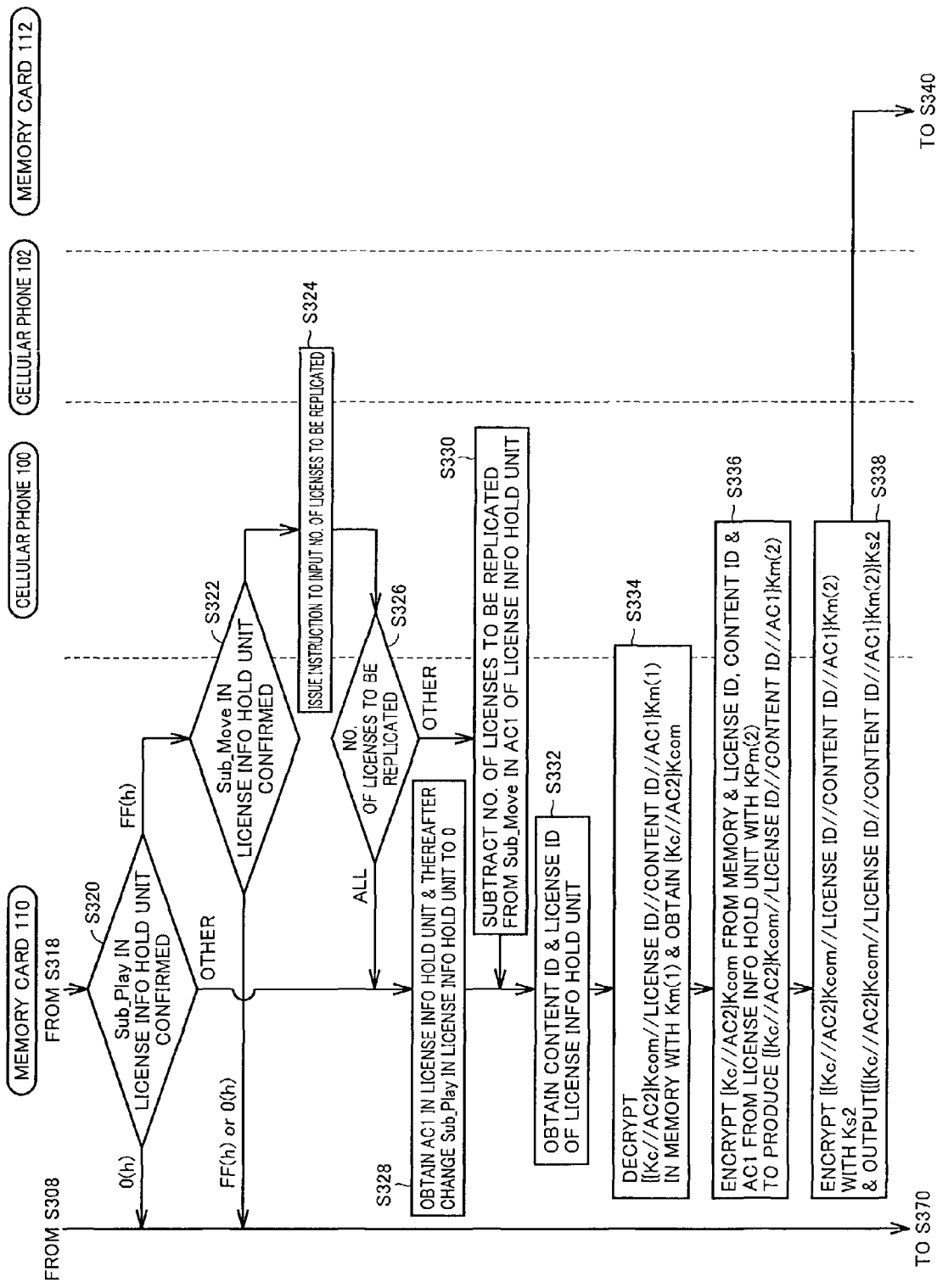
Figure 14:
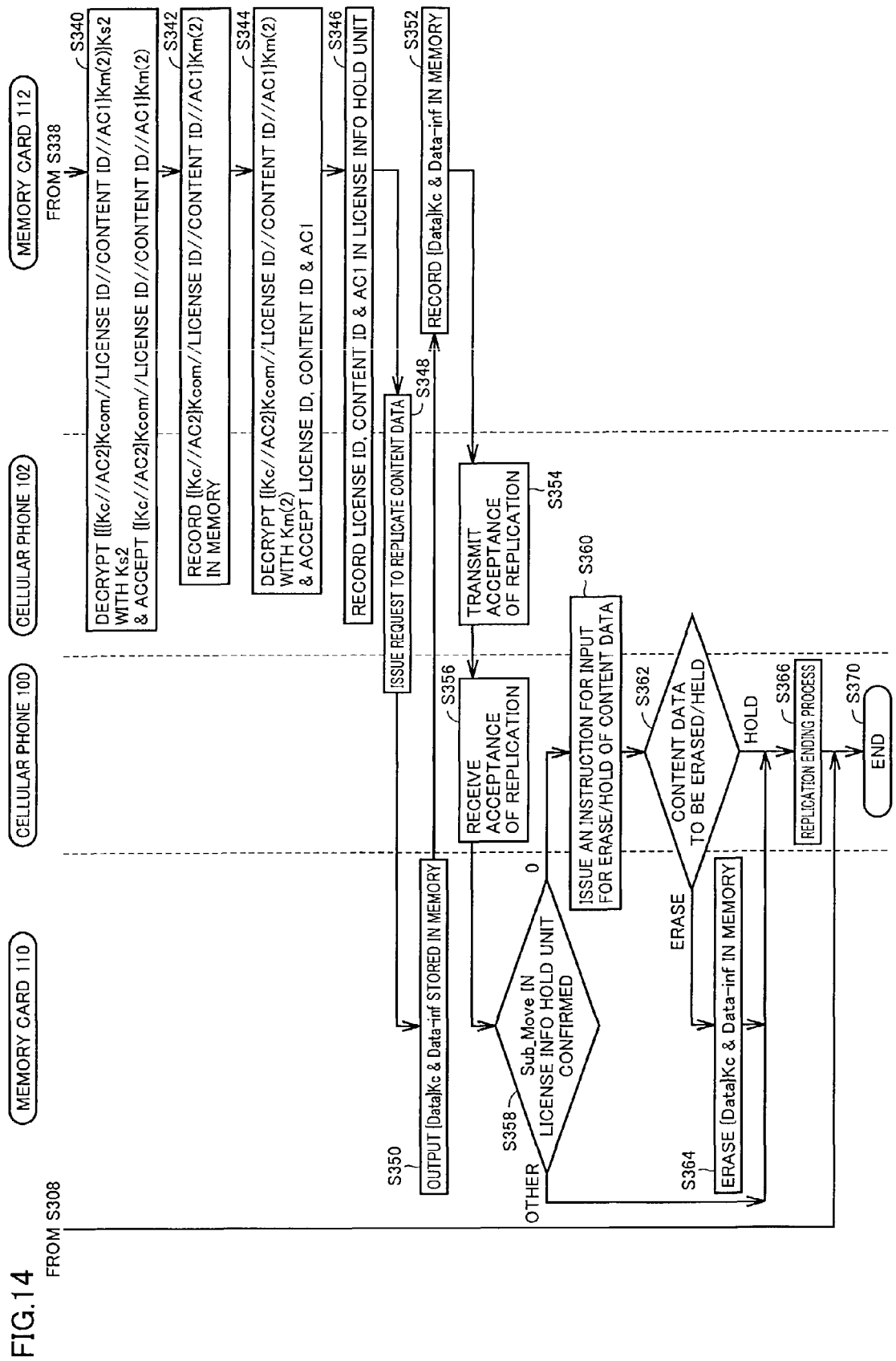

In FIGS. 12, 13 and 14, cellular phone 100 and memory card 110 have their types identified by natural number m=1 and natural number n=1 and cellular phone 102 and memory card 112 have their types identified by natural number m=2 and natural number n=2, and memory cards 110 and 112 are identified by natural number i=1 and natural number i=2, respectively, for the sake of illustration.

Cellular phone 100 and memory card 110 are a transmitting side and cellular phone 102 and memory card 112 are a receiving side for the sake of illustration. Furthermore, cellular phone 102 has attached thereto memory card 112 similar in configuration to memory card 110 for the sake of convenience. Each component of memory card 112 will be described, denoted by a reference character identical to that of the corresponding component of memory card 110.

With reference to FIG. 12, cellular phone user 1 on the transmitting side initially for example presses a key of key unit 1108 to issue from cellular phone 100 a request to replicate content. (step S300).

The replication request is received by cellular phone 102 of cellular phone user 2 corresponding to the receiving side and it is transmitted to memory card 112. In memory card 112, authentication data hold unit 1500 outputs authentication data {KPmc(2)//Cmc(2)}KPma corresponding to an encryption of public encryption key KPmc(2) and class certificate Cmc (2) corresponding to memory card 112 (step S302).

Authentication data {KPmc(2)//Cmc(2)}KPma of memory card 112 is transmitted from cellular phone 102 of cellular phone user 2 and received by cellular phone 100 of cellular phone user 1 and thus memory card 110 (step S304).

In memory card 110, decryption unit 1408 decrypts the authentication data of memory card 112 to accept the class certificate Cmc(2) and public encryption key KPmc(2) associated with memory card 112 (step S306). Controller 1420 performs an authentication operation based on a result of decryption obtained by authentication unit 1408 and transmitted on data bus BS3 (step S308).

Controller 1420 can confirm, from a result of decrypting with authentication key KPma authentication data {KPmc (2)//Cmc(2)}KPma related to memory card 112, whether {KPmc(2)//Cmc(2)}KPma is authentication data output from a proper key, and if it is valid authentication data output from a proper key then public encryption key KPmc(2) and class certificate Cmc(2) are approved and a subsequent step S310 is carried out. If it cannot be confirmed that the authentication data is output from a proper key and it is thus determined invalid then the control terminates the replication session (step S370).

Then controller 1420 instructs session key generation unit 1418 to output session key Ks3 generated on the transmitting side in a replication session. Session key Ks3 thus generated is transmitted to encryption unit 1410.

Encryption unit 1410 also receives public encryption key KPmc(2) of memory card 112 decrypted at step S306 by decryption unit 1408 and uses KPmc(2) to encrypt session key Ks3. Thus, encrypted session key {Ks3}Kmc(2) is output on data bus BS3 (step S312) and transmitted via cellular phones 100 and 102 to memory card 112.

Memory card 112 receives {Ks3}Kmc(2) output from memory card 110, at decryption unit 1404 decrypts it with private decryption key Kmc(2) corresponding to memory card 112, and accepts session key Ks3 generated by memory card 110 corresponding to the transmitting side (step S314).

In memory card 112 controller 1420 in response to the acceptance of session key Ks3 instructs session key generation unit 1418 to generate session key Ks2 to be generated on the receiving side in a transfer session. Session key Ks2 thus generated is transmitted to encryption unit 1406 via contact Pf of switch 1446 and contact Pc of switch 1444.

Encryption unit 1406 receives from decryption unit 1404 session key Ks3 obtained at step S316, uses session key Ks1 to encrypt session key Ks2 and public encryption key KPm(2) obtained by switching contact Pc of switch 144 and a contact of switch 1446, and outputs {Ks2//KPm(2)}Ks3 on data bus BS3 (step S316). Encrypted data {Ks2//KPm(2)} on data bus BS3 is transmitted via cellular phones 102 and 100 and received by memory card 110 and transmitted on data bus BS3.

In memory card 100 the encrypted data transmitted on data bus BS3 is decrypted by decryption unit 1412 using session key Ks3 to accept session key Ks2 and public encryption key KPm(2) associated with memory card 112 (step S318).

With reference to FIG. 13, in memory card 110 controller 1420 in response to the acceptance of session key Ks2 and public encryption key KPm(2) confirms access restriction information AC1 held in license information hold unit 1440.

Initially, the control confirms a corresponding reproduction frequency limit information Sub_Play stored in license information hold unit 1420 and if it has a value of 0 it indicates that a corresponding license is not reproducible and the control terminates the replication session (step S370). If reproduction frequency limit information Sub_Play has a value other than 0 then the control proceeds with the process of the replication session (step S320).

Controller 1420 then confirms a corresponding number of licenses owned Sub_Move stored in license information hold block 1440 and if it has a value of 0 or FF(h) it indicates that there no longer exists any license or that replicating the license of interest has been prohibited from the outset and the control thus terminates the replication session (step S370). If value Sub_Move has a value other than 0 and FF(H)0 then the control moves on to a subsequent step (step S322).

At the subsequent step, control 1420 updates value Sub_Move. At step S324 is effected an instruction to input a number of licenses to be replicated and if the instruction is issued to replicate all of the remaining licenses (step S326) controller 1420 obtains access restriction information AC1 from license information hold unit 1440 and updates value Sub_Move to have a value of 0 (step S328).

If a number of licenses to be replicated that is indicated at step S324 is smaller than the number of remaining licenses (step S326) then controller 1420 obtains access restriction information AC1 from license information hold unit 1440, subtracts from value Sub_Move the input number of licenses to be replicated, and updates access restriction information AC1 in license information hold unit 1440 (step S330). When value Sub_Move attains 0, any subsequent reproduction and replication are prohibited.

Controller 1420 after it has updated value Sub_Move obtains a corresponding content ID and license ID from license information hold block 1440 (step S332).

Furthermore controller 1420 instructs memory 1415 to output encrypted data {{Kc//AC2}Kcom//license ID//content ID//AC1}Km(1) related to session key Kc and reproduction information corresponding to the content data to be replicated. Memory 1415 outputs encrypted data {{Kc//AC2}Kcom//license ID//content ID//AC1}Km(1), which is in turn decrypted by decryption unit 1422 and {Kc//AC2}Kcom is obtained on data bus BS4 (step S334).

The license ID, content ID and access restriction information AC1 obtained at step S332 from license information hold unit 1440, and {Kc//AC2}Kcom obtained at step S334, are taken in to encryption unit 1424 and encrypted therein. Encryption unit 1424 encrypts these data with public encryption key KPm(2) unique to the receiving memory card 112 obtained at step S320 by decryption unit 1412, and outputs {{Kc//AC2}Kcom//license ID//content ID//AC1}Km (2) (step S336).

Encrypted data {{Kc//AC2}Kcom//license ID//content ID//AC1}Km(2) is output on data bus BS4 and transmitted via contact Pd of switch 1444 to encryption unit 1406, which receives via contact Pb of switch 1442 session key Ks2 generated by memory card 112 and obtained by decryption unit 1412, and uses session key Ks2 to encrypt data received via contact Pd.

Encryption unit 1406 outputs {{Kc//AC2}Kcom//license ID//content ID//AC1}Km(2)}Ks2 on data bus BS3 (step S338). The encrypted data on data bus BS3 is then transmitted via cellular phones 100 and 102 to memory card 112 corresponding to the receiving side in the replication session.

With reference to FIG. 14, In memory card 112 decryption unit 1412 effects decryption using session key Ks2 generated by session key generation unit 1418, and {{Kc//AC2}Kcom//license ID//content ID//AC1}Km (2) is accepted (step S340).

The encryption provided by public encryption key KPm (2), {{Kc//AC2}Kcom//license ID//content ID//AC1}Km (2), is recorded in memory 1415 (step S342). Furthermore decryption unit 1422 uses private decryption key Km(2) unique to memory card 112 to effect decryption to accept a license ID, a content ID and access restriction information AC1 (step S344).

The license ID, content ID and access restriction information AC1 obtained in decryption unit 1422 are transmitted on data bus BS4 and recorded in license information hold unit 1440 (step S346).

By thus normally completing the process up to step S338, reproduction information is replicated, and in response thereto a request to replicate content data is sent via cellular phone 102 (step S348).

The request to replicate content data is transmitted via cellular phone 100 to memory card 110 and responsively in memory card 110 memory 1415 outputs the corresponding encrypted content data {Data}Kc and additional information Data-inf on data bus BS3 (step S350).

These data on data bus BS3 are transmitted via cellular phones 100 and 102 to memory card 112 and stored in the memory card at memory 1415 (step S352).

When encrypted content data {Data}Kc and additional information Data-inf are completely recorded, an acceptance of the replication is transmitted via cellular phone 102 (step S354).

Thus, if in memory card 112 and the corresponding cellular phone 102 a reproduction session is normally carried out, cellular phone 102 can reproduced encrypted content data recorded in memory card 112 and the user can listen to the music.

The transmitting cellular phone 100 receives the acceptance of a replication transmitted from cellular phone 102 (step S356).

When an acceptance of the replication is received, in memory card 110 is confirmed a number of licenses owned Sub_Move held in license information hold unit 1440 (step S358) and if it has a value of 0 or there is no more license then a request is issued to the user to input via key unit 1108 whether encrypted content data {Data}Kc and additional information Data-inf are to be erased or held (step S360).

If the user desires to erase content data no longer having any license, the user can input an instruction via key unit 1108 to effect erasure (step S362) to erase the corresponding encrypted content data {Data}Kc and additional information Data-inf stored in memory card 110 at memory 1415 (step S364). Note that the corresponding reproduction information including a content ID recorded in license information hold unit 1440 has access restriction information AC1 with Sub_Move having been updated at step S328 to be 0 and any subsequent reproduction and replication sessions are thus prohibited.

If the instruction indicates that content data and the like are to be held and the license information hold unit has value Sub_Move other than 0 (i.e., there still remain any license(s)) then step S364 is skipped and at this stage the replication process ends (step S366).

If the replication process ending step S366 provided when a replication session is normally effected, or authentication-checking or the like results in suspending a reproduction session, the controls skips the process from steps S308, S320 and S322 and the process of the entire reproduction session ends (S370).

Thus also in a replication session the receiving circuit's content reproduction circuit (a cellular phone) and memory card have their authenticity checked in advance before a license key, encrypted content data and the like are replicated. Thus, the system can prohibit replicating content data for any reproduction circuits (cellular phones) or memory cards that are not authenticated.

Furthermore, a variation of a license in a reproduction operation can be reflected uniquely by the memory card in access restriction information AC1 (Sub_Move) held in the memory card. Thus the system can prevent replicating reproduction information and encrypted content data, as many times as desired.

Note that there may be provided a distribution service in which, with encrypted content data {Data}Kc recorded in memory 1415, distribution server 30 can newly be accessed and only reproduction information can be distributed and received. If only reproduction information is distributed and received, again encrypted content data {Data}Kc can be reproduced and the user can enjoy listening to the music.

Although the process of distributing only reproduction information is not represented in the form of a flow chart, it corresponds to the distribution session of FIGS. 9 and 10 minus the steps relating to the communication of encoded content data, i.e., steps S146, S148, S150 and S152 and it thus will not be described in detail.

Furthermore, while at step S328 if reproduction information in license information hold unit 1440 is obtained in order to effect replication then in access control information AC1 value Sub_Move is updated to have a value of 0, erasing the data of interest from license information hold unit 1440 is also similarly effective.

Thus the first embodiment provides an information distribution system capable of holding and updating access restriction information, such as a number of licenses owned and a number of times of reproduction allowed, in a memory card at a TRM area without involving a distribution server. Thus the access restriction information can be protected against improper changes otherwise introduced from an upper level by means of file systems, application programs and the like. Thus the copyright of content data can more firmly be protected.

Second Embodiment

A second embodiment provides a data distribution system different in configuration from that of the first embodiment in that the former does not provide encryption decryptable with secret key Kcom shared by reproduction circuits.

More specifically the data distribution system of the present embodiment includes a license server 11 in place of license server 10 of distribution server 30 of the data distribution system of the first embodiment. Furthermore in the present embodiment the data distribution system includes a cellular phone having a configuration of cellular phone 101, rather than that of cellular phone 100 as described with reference to FIG. 5.

Figure 15:
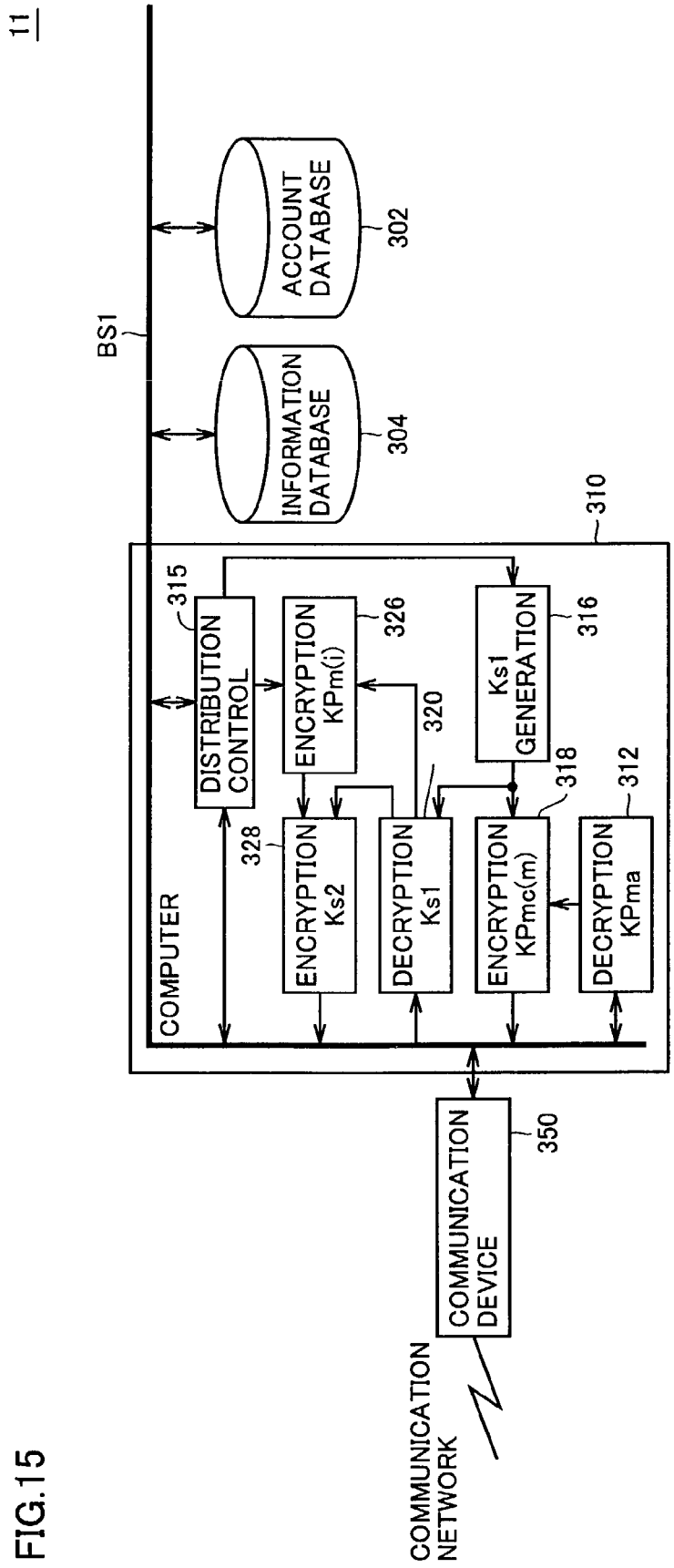
FIG. 15 is a schematic block diagram showing a configuration of a license server according to a second embodiment.

With reference to FIG. 15, license server 11 is different from license server 10 in that the former excludes unit 322 holding secret key Kcom shared by reproduction circuits, and encryption unit 324 using secret key Kcom. More specifically, in license server 11 license key Kc and reproduction circuit control information AC2 output from distribution control unit 315 are transmitted directly to encryption unit 326.

The remaining circuit configurations and operations are similar to those of the FIG. 4 license server 10 and thus will not be described.

Hereinafter license server 11, authentication server 12 and distribution carrier 20 will generally be referred to as a distribution server 31.

Figure 16:
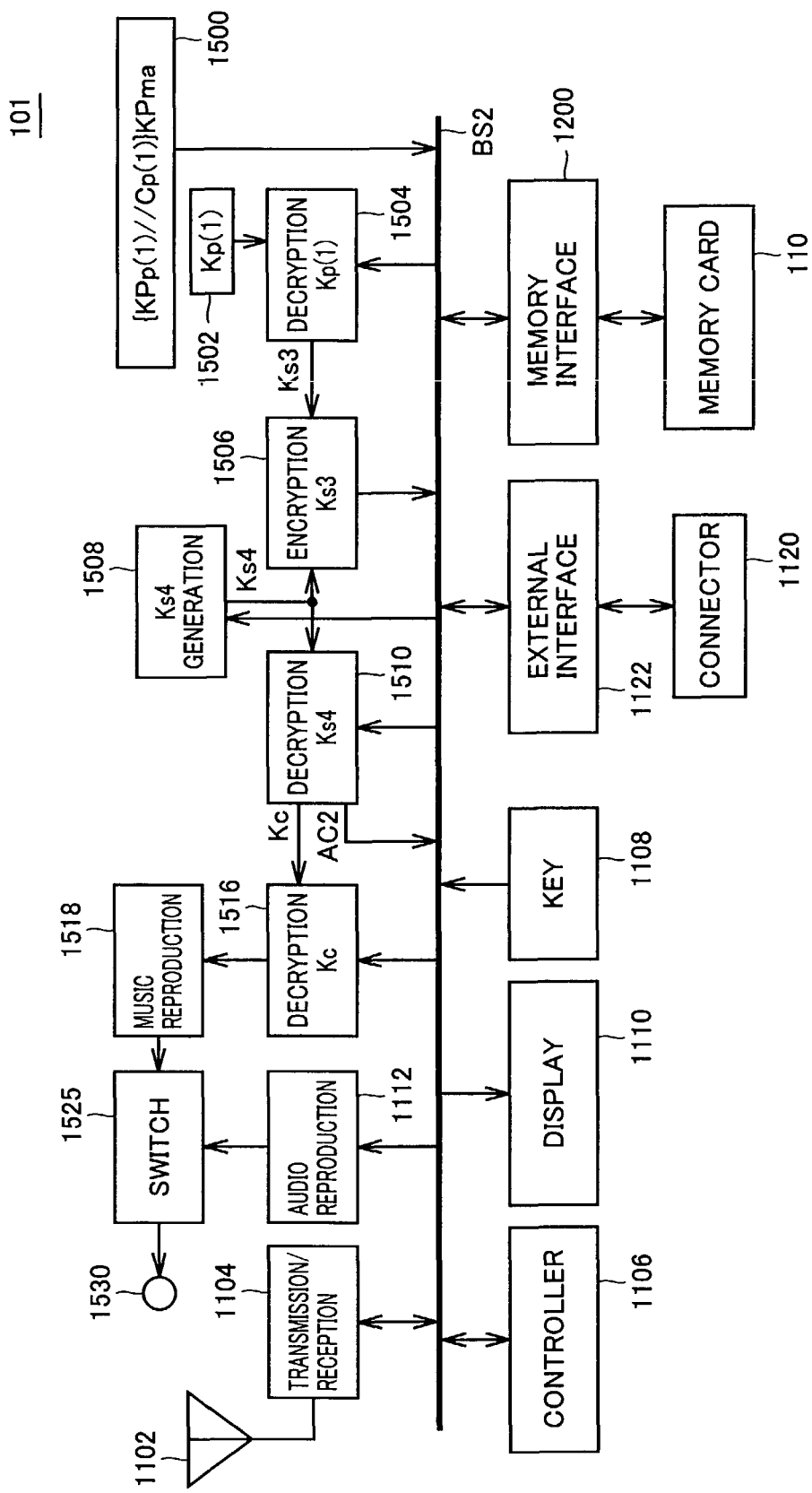
FIG. 16 is a schematic block diagram showing a configuration of a cellular phone according to the second embodiment.

With reference to FIG. 16, the data distribution system of the present embodiment uses cellular phone 101 different in configuration from cellular phone 100 of the first embodiment in that the former excludes Kcom hold unit 1512 holding secret key Kcom shared by reproduction circuits and decryption unit 1514 using secret key Kcom.

More specifically, in cellular phone 101, corresponding to the fact that distribution server 31 does not provide encryption using secret key Kcom, encryption unit 1510 using session key Ks4 to effect decryption directly provides license key Kc, which is thus provided to decryption unit 1510 directly. The remaining circuit configurations and operations are similar to those of cellular phone 100 and thus will not be described.

Furthermore in the present embodiment the data distribution system uses a memory card identical in configuration to the FIG. 6 memory card 110.

Omitting the encryption using secret key Kcom shared by reproduction circuits results in a difference in operation in each of distribution, reproduction and replication sessions, as will now be described with reference to a flow chart.

Figure 17:
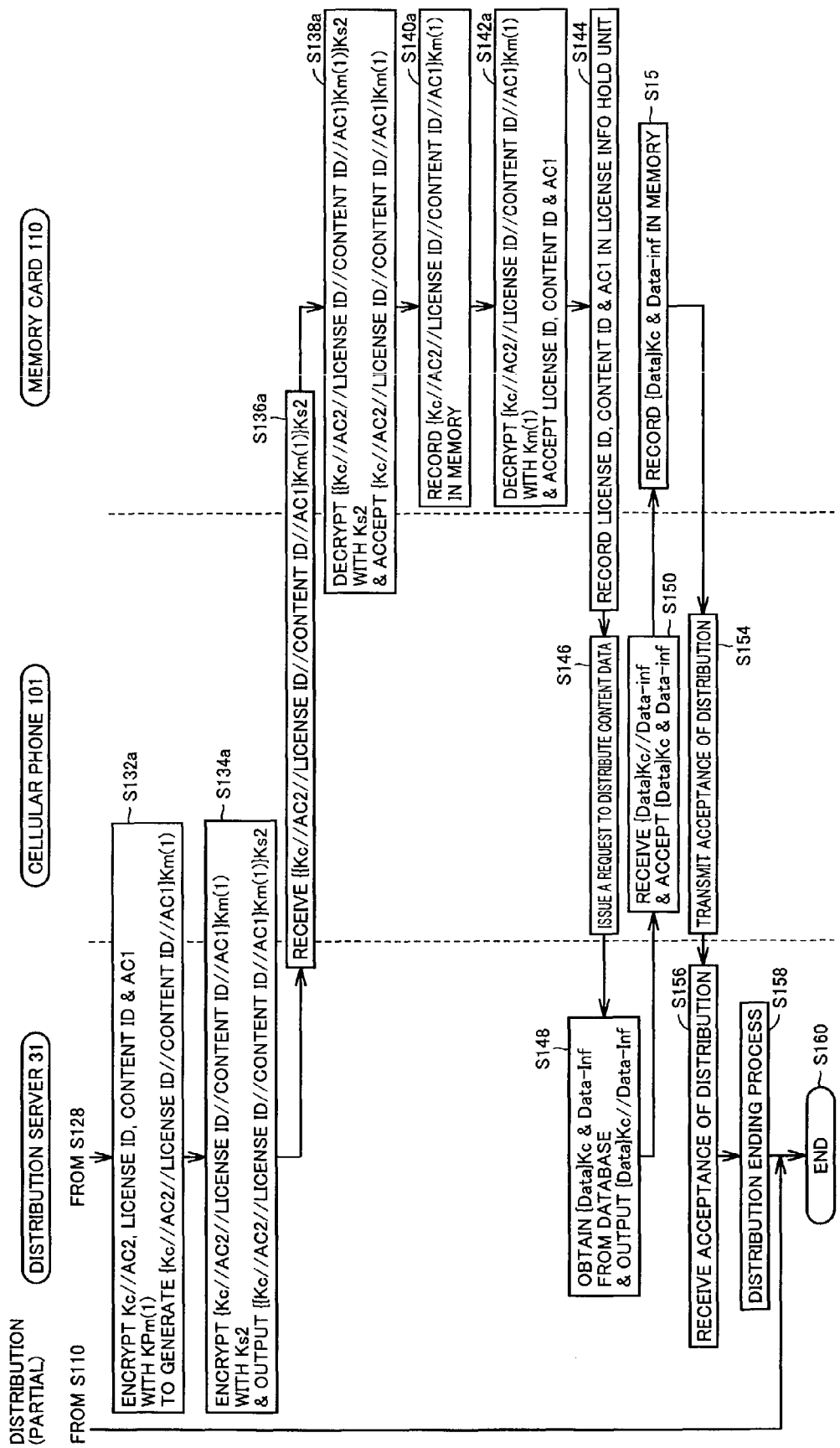
FIG. 17 is a flow chart for illustrating a data distribution system according to the second embodiment in a distribution operation.

FIG. 17 is a flow chart for illustrating a distribution operation in the data distribution system of the second embodiment. With reference to FIG. 17, a description will be made of a difference from the FIGS. 9 and 10 flow chart of the distribution operation in the data distribution system of the first embodiment.

FIG. 17 describes an operation allowing a cellular phone user using memory card 110 to receive via cellular phone 101 content data corresponding to music data distributed from distribution server 31 of the second embodiment.

With reference to FIG. 17 the second embodiment also provides a distribution operation with steps S100 to S128 similar to those in the FIG. 10 flow chart and the steps thus will not be shown or described in detail.

As has been described with reference to FIG. 15, license key Kc and reproduction circuit control information AC2 obtained at step S128 are not encrypted with secret key Kcom and they are encrypted with public encryption key KPm(1) unique to memory card 110 and step S130 is thus eliminated.

Hereinafter, step S128 is followed by steps S132a-S142a, rather than steps S132-S142. Steps S132a-S142a are different from steps S132-S142 in that license key Kc and reproduction control information AC2 operated in steps S136-S146 are changed from an encrypted form {Kc//AC2}Kcom to an exact form Kc and AC2 and thus used. The remaining encryption and decryption processes are similar to those having described with reference to FIG. 10 and thus will not be described.

Figure 18:
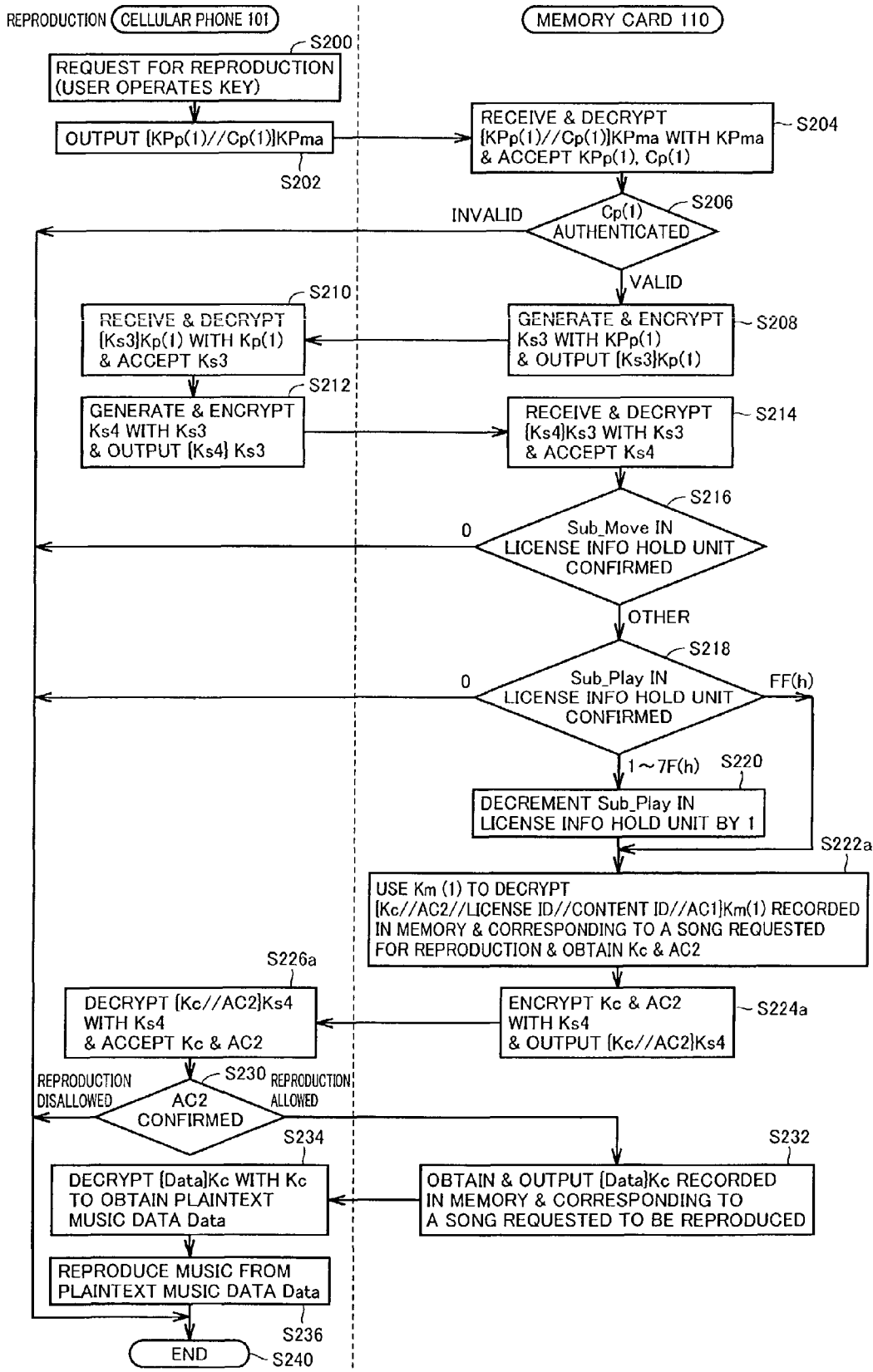
FIG. 18 is a flow chart for illustrating a reproduction operation according to the second embodiment.

FIG. 18 is a flow chart of a reproduction operation in the data distribution system of the second embodiment.

With reference to FIG. 18, in the data distribution system of the second embodiment cellular phone 101 operates in a reproduction operation, as has been described in the first embodiment with reference to FIG. 11, except that steps S222-S226 are replaced by steps S222a-S226a.

Steps S222a-S226a differ from steps S222-S226 in that license key Kc and reproduction control information AC2 are changed from an encrypted form {Kc//AC2}Kcom to an exact form Kc//AC2 and thus used. The remaining encryption and decryption processes are similar to those described with reference to FIG. 11 and thus will not be described. The remaining steps are also similar to those shown in FIG. 11 and thus will not be described.

Figure 19:
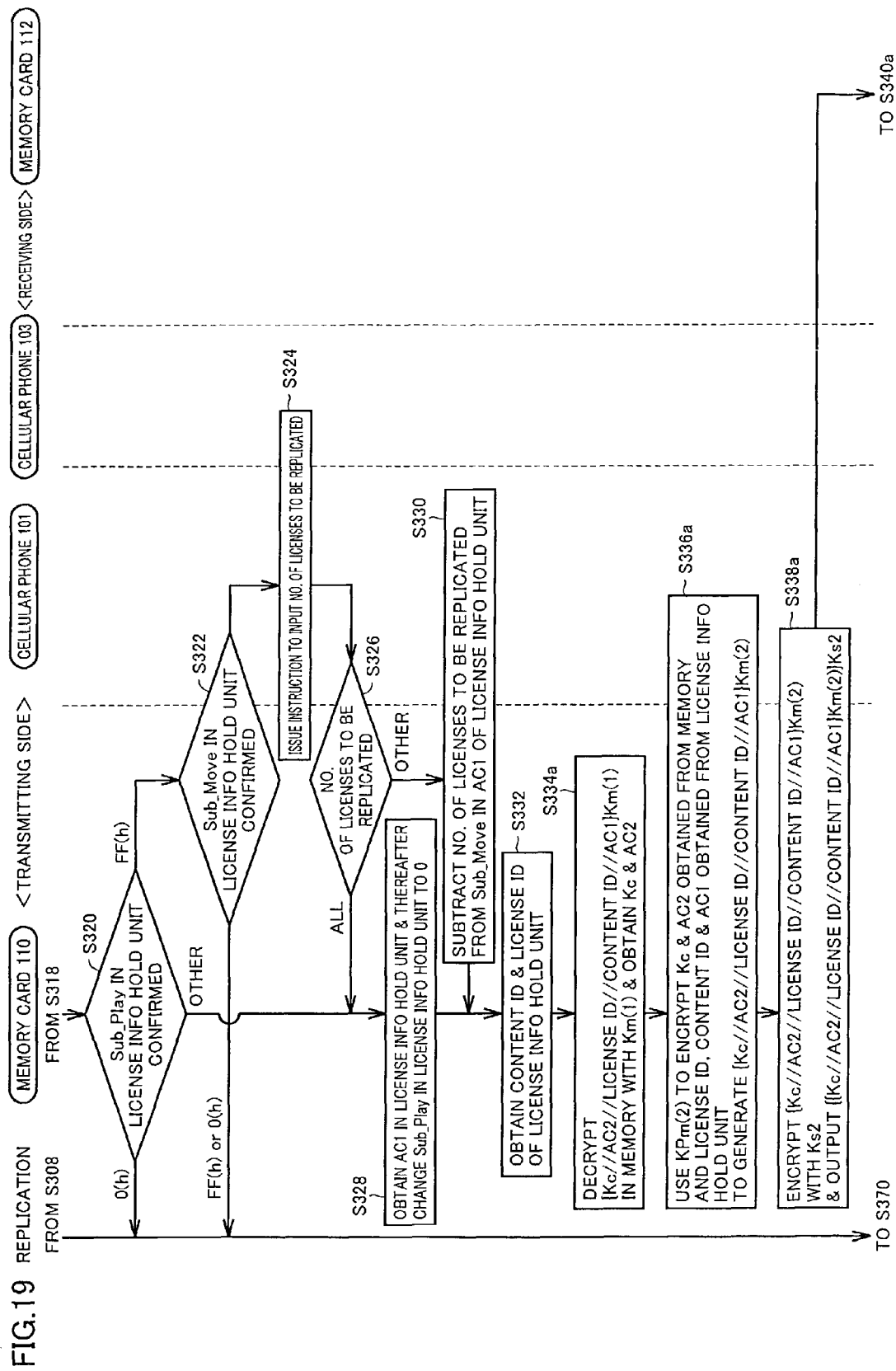
FIGS. 19 and 20 are first and second flow charts, respectively, for illustrating an operation in a replication session between two memory cards in the data distribution system of the second embodiment.
Figure 20:
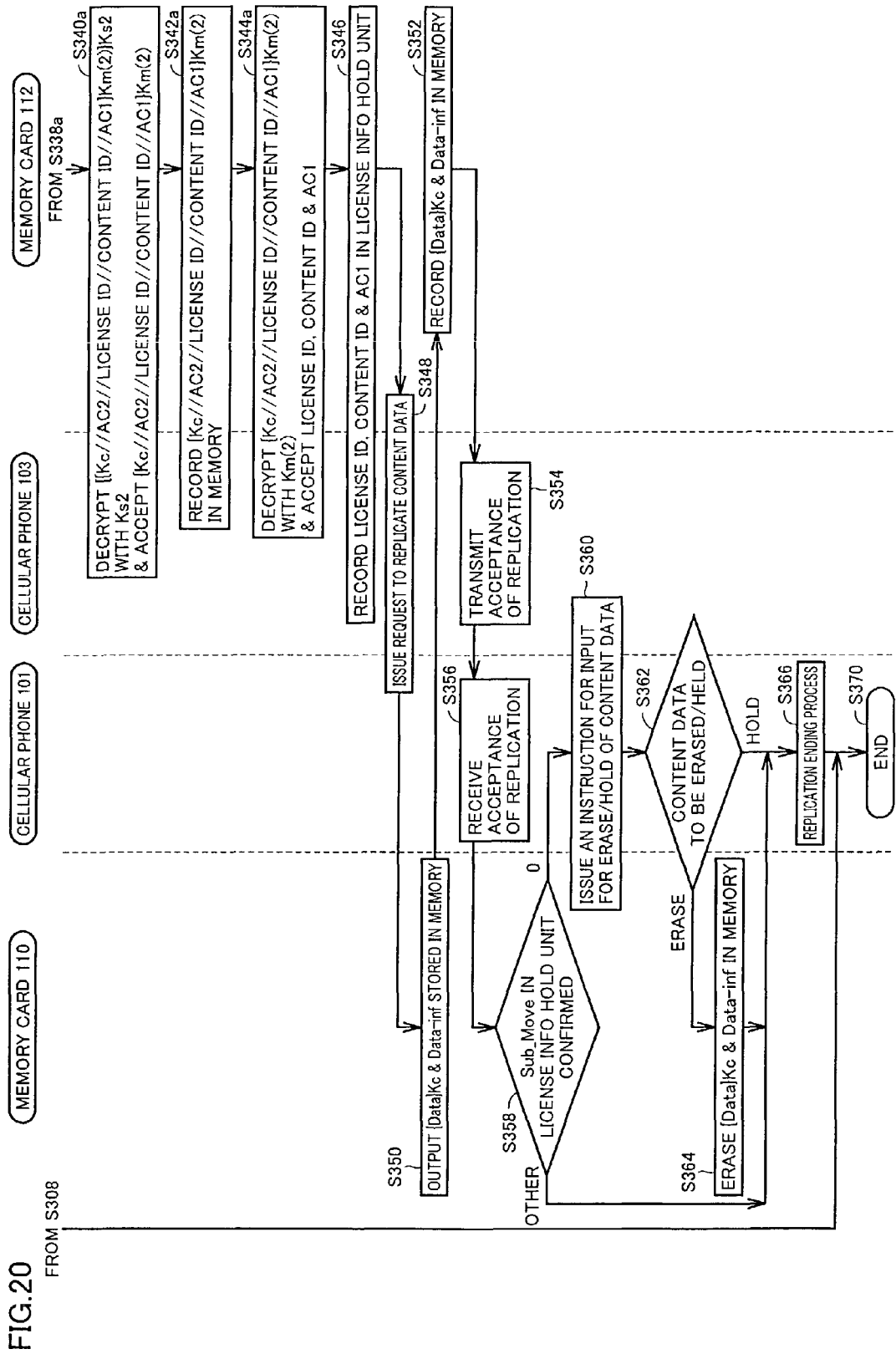

FIGS. 19 and 20 are a flow chart of a replication operation in the data distribution system of the second embodiment.

FIGS. 19 and 20 represent a process replicating content data, key data and the like between two memory cards 110 and 112 via cellular phones 101 and 103 of the second embodiment.

Cellular phone 100 and memory card 110 have their types identified by natural number m=1 and natural number n=1 and cellular phone 103 and memory card 112 have their types identified by natural number m=2 and natural number n=2, and memory cards 110 and 112 are identified by natural number i=1 and natural number i=2, respectively, for the sake of illustration.

With reference to FIGS. 19 and 20, a description will be provided of the steps different from those of the replication operation described in the first embodiment with reference to the FIGS. 12-14 flow chart.

The FIG. 12 steps S300 to S338 are similarly executed in the replication operation according to the second embodiment and thus will not be described in detail.

With reference to FIGS. 19 and 20, the data distribution system of the second embodiment in a replication session operates as has been described with reference to the FIGS. 13 and 14 except that steps S334 to S344 are replaced by steps S334a to S344a and that step S228 is eliminated.

Steps S334a-S344a differ from steps S334-S344 in that license key Kc and reproduction circuit control information AC2 used in the latter steps are changed from an encrypted form {Kc//AC2}Kcom to an exact form Kc and AC2 and thus used. Furthermore, step S228 is eliminated as the encryption using secret key Kcom is not applied to license key Kc or reproduction control information AC2.

The remaining encryption and decryption processes are similar to those described with reference to FIGS. 13 and 14, and thus will not be described.

The remaining steps are also similar to those shown in FIGS. 13 and 14 and thus will not be described.

Thus, if secret key Kcom shared by reproduction circuits is not used, a data distribution system can be configured to be as effective as that of the first embodiment.

Third Embodiment

In a third embodiment a data distribution system differs in configuration from that of the second embodiment in that in the former, license key Kc and reproduction circuit control information AC2 are not encrypted and they are recorded in a memory card in the form of plaintext.

More specifically, the distribution system of the third embodiment is different in that memory card 110 of the second embodiment is replaced by a memory card 210. Distribution server 31 and cellular phone 101 are configured identical to those of the previous embodiment.

Figure 21:
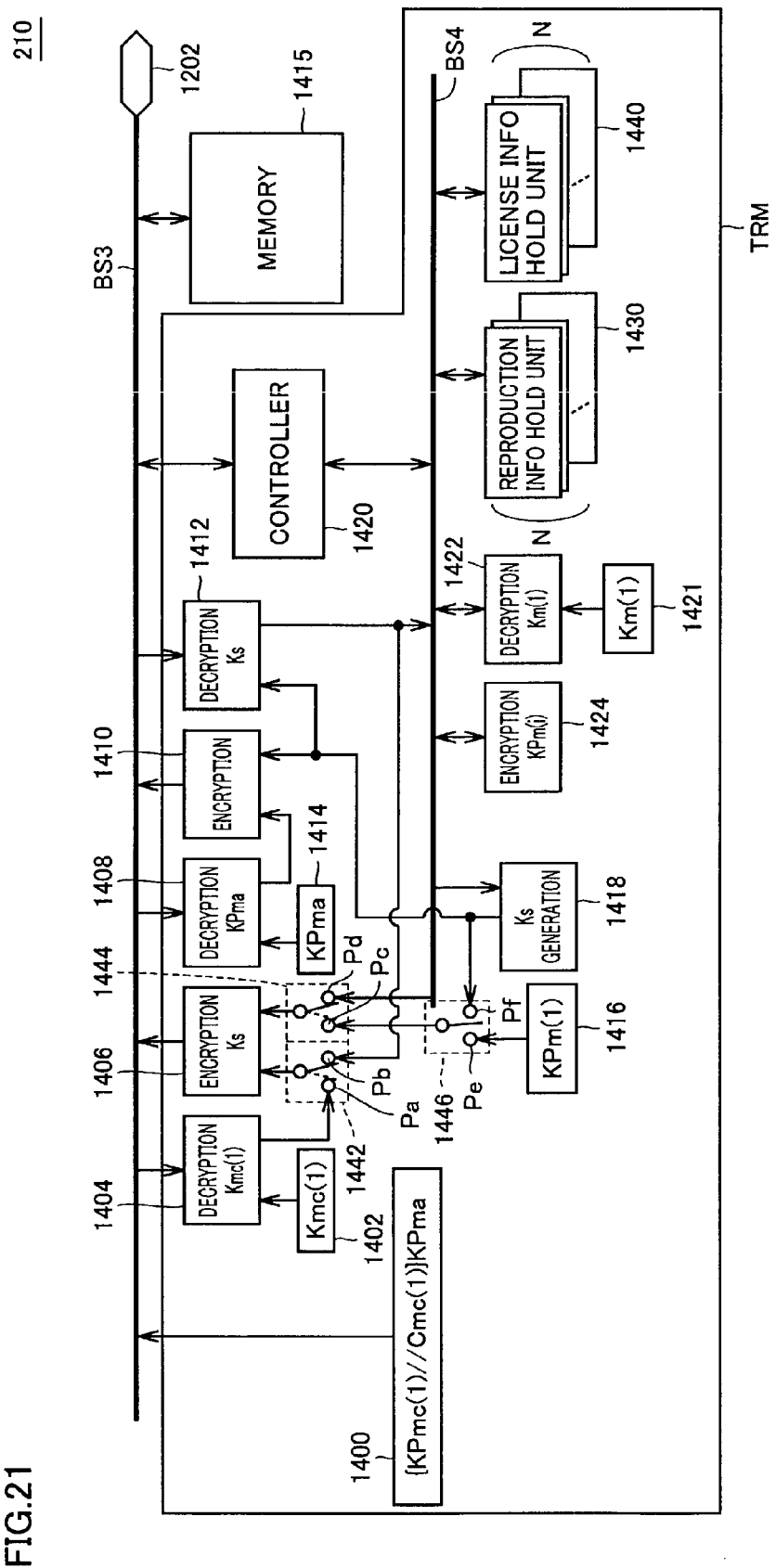
FIG. 21 is a schematic block diagram showing a configuration of a memory card according to a third embodiment.

With reference to FIG. 21, memory card 210 differs from memory card 110 in that the former does not involve communicating data with memory 1415 on data bus BS4 and that it includes a reproduction information control unit 1430 storing license key Kc and reproduction circuit control information AC2 therein. Reproduction information hold unit 1430 is provided only in a TRM area and capable of communicating data on data bus BS4.

Unlike in the second embodiment, in the present embodiment license key Kc and reproduction circuit control information AC2 encrypted with public encryption key KPm(1) and thus transmitted to the memory card, are not stored directly to memory 1415. More specifically, license key Kc and reproduction control information AC2 are decrypted by decryption unit 1422, and then transmitted on data bus BS4 and held in reproduction information hold unit 1430 in the form of plaintext.

Figure 22:
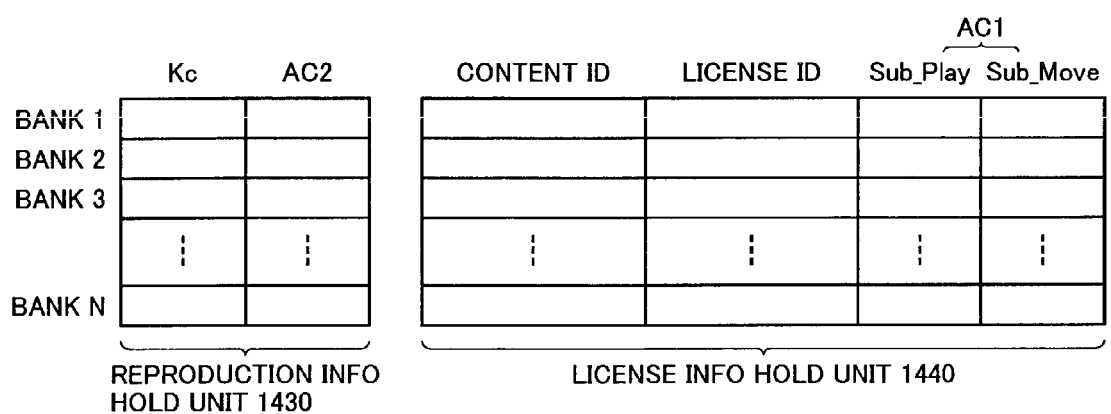
FIG. 22 is a conceptual diagram illustrating a configuration of information stored in a reproduction information hold unit and a license information hold unit.

With reference to FIG. 22, reproduction information hold block 1430 has N banks corresponding to license information hold unit 1440, each holding license key Kc and reproduction circuit control information AC2 corresponding to a license, when it uses a bank corresponding to a bank holding the license ID, content ID and access restriction information AC1 held in license information hold unit 1440 and corresponding to the same license.

The remainder of the configuration is similar to that of memory card 110 and thus will not be described in detail. Note that although natural numbers i and m determined for a memory card inherently cannot have a value equal to that of memory card 110, in the following description natural number i=1 and natural number m=1, as have been applied in the first and second embodiments for memory card 110, to simplify the description.

Although not shown in the form of a flow chart, the third embodiment provides a distribution operation as has been described in the second embodiment with reference to the FIG. 17 destitution operation flow chart, except that a modification is introduced in the steps S140a and S142a of recording a license.

At the step corresponding to step S140a, encrypted data {Kc//AC1//license ID//content ID//AC2}Km(1) is decrypted by decryption unit 1422 using private decryption key Km(1) and the obtained license key Kc and reproduction circuit control information AC2 are recorded in reproduction information hold unit 1430. Furthermore, at the step corresponding to step S142a, the license ID, content ID and access restriction information AC1 decrypted and thus obtained at the step corresponding to step S140a, are recorded in license information hold unit 1440 at a bank corresponding to reproduction information hold unit 1430. The other steps in the reproduction operation are similar to those in the second embodiment and thus will not be described.

Similarly, although not shown in the form of a flow chart, the third embodiment provides a reproduction operation as has been described in the second embodiment with reference to the FIG. 18 reproduction operation flow chart, except that a modification is introduced in the step S222a of obtaining license key Kc and reproduction circuit control information AC2 from memory 1415. More specifically, in the step corresponding to step S222a, license key Kc and reproduction circuit control information AC2 are obtained from reproduction information hold unit 1430. The other steps of the reproduction operation are similar to those in the second embodiment and thus will not be described.

Thus the distribution system of the third embodiment differs from that of the second embodiment simply only in that memory card 210 provides a different internal processing and the systems can be operated compatible with each other.

Similarly, although not shown in the form of a flow chart, the third embodiment provides a replication operation, as well as the distribution and reproduction operations, as has been described in the second embodiment with reference the FIGS. 19 and 20 replication operation flow chart, except that a modification is introduced in the step S334a of obtaining license Kc and reproduction circuit control information AC2 from memory 1415, the step S342a of recording a license, and step S344a. More specifically, in the step corresponding to step S342a, encrypted data {Kc//AC2//license ID//content ID//AC1}Km(2) is decrypted by decryption unit 1422 using private decryption key Km(2) and the obtained license key Kc and reproduction circuit control information AC2 are recorded in reproduction information hold unit 1430. Furthermore, at the step corresponding to step S344a, the license ID, content IC and access restriction information AC1 decrypted and thus obtained at the step corresponding to step S342a, are recorded in license information hold unit 1440 at a bank corresponding to reproduction information hold unit 1430.

Note that the distribution system of the second embodiment differs only in the memory card's internal operation and memory card 110 of the second embodiment is thus compatible with memory card 210 of the third embodiment, and in that sense the distribution system of the second embodiment and that of the third embodiment can be operated in the same distribution system.

Furthermore, memory card 210 of the third embodiment is also applicable in a combination with the distribution system of the first embodiment. More specifically, license key Kc and reproduction circuit control information AC2 that are encrypted with secret key Kcom in the form of {Kc//AC2}Kcom can be recorded in reproduction information hold unit 1430.

In connection with the above, the distribution system of the first embodiment has its process steps modified as will now be described.

The third embodiment combined with the first embodiment provides a distribution operation, as described in the first embodiment with reference to the FIG. 10 flow chart, except that a modification is introduced in the steps S140 and S142 of recording a license.

At the step corresponding to step S140, encrypted data {Kc//AC2//license ID//content ID//AC2}Km(1) is decrypted by decryption unit 1422 using private decryption key Km(1) and the obtained license key Kc and reproduction circuit control information AC2 are recorded in reproduction information hold unit 1430. Furthermore, at the step corresponding to step S142, the license ID, content ID and access restriction information AC1 decrypted and thus obtained at the step corresponding to step S140, are recorded in license information hold unit 1440 at a bank corresponding to reproduction information hold unit 1430. The other steps in the reproduction operation are similar to those in the first embodiment and thus will not be described.

Similarly, the third embodiment combined with the first embodiment provides a reproduction operation, as described in the first embodiment with reference to the FIG. 11 reproduction operation flow chart, except that a modification is introduced in the step S222 of obtaining license key Kc and reproduction circuit control information AC2 from memory 1415. More specifically, at the step corresponding to step S222, license key Kc and reproduction circuit control information AC2 are obtained from reproduction information hold unit 1430 in the form of {Kc//AC2}Kcom. The remaining steps of the reproduction operation are similar to those in the first embodiment and thus will not be described.

Similarly, the third embodiment combined with the first embodiment provides a replication operation, as well as the distribution and reproduction operations, as described in the first embodiment with reference to the FIG. 13 and FIG. 14 replication operation flow chart, except that a modification is introduced in the step S334 of obtaining license Kc and reproduction circuit control information AC2 from memory 1415 in the form of {Kc//AC2}Kcom, the steps S342 of recording a license, and S344. More specifically, at the step corresponding to step S342, encrypted data {{Kc//AC2}//Kcom license ID//content ID//AC1}Km(2) is decrypted by decryption unit 1422 using private decryption key Km(2) and the obtained {Kc//AC2}Kcom is recorded in reproduction information hold unit 1430. Furthermore, at the step corresponding to step S344, the license ID, content ID and access control information AC1 decrypted and thus obtained at the step corresponding to step S342, are recorded in a license information hold unit 1440 at a bank corresponding to reproduction information hold unit 1430.

Thus the distribution system of the third embodiment differs from that of the first embodiment simply only in that memory card 210 provides a different internal processing and the systems can thus be operated compatible with each other.

Note that the distribution system of the first embodiment differs only in the memory card's internal operation and memory card 110 of the first embodiment is thus compatible with memory card 210 of the third embodiment, and in that sense the distribution systems of the first and third embodiment can be combined together and thus operated in a single distribution system.

Note that while in FIG. 21 reproduction information hold unit 1430 and license information hold unit 1440 arranged in a TRM area are described as blocks each having an independent function, they may be arranged in the form of a common memory. Furthermore, if memory 1415 is arranged of a module TRM, as has been described in the first embodiment, memory 1415, reproduction information hold unit 1430 and license information hold unit 1440 may be arranged on a common, single memory.

Note that while the embodiments described above all provide a reproduction operation allowing more than one license to be replicated at one time, they can also be configured to provide a replication operation allowing only a single license to be replicated at one time. This can be achieved simply, as described in the first embodiment with reference to the FIG. 13 flow chart and in the second and third embodiments with reference to the FIG. 20 flow chart, except that step S324 is eliminated and step S326 is modified to determine that a number of licenses replicated is "1".

Furthermore, while in the above description a license is copied, as limited by the constraint of a number of licenses owned Sub_Move of access control information AC1, it can be replicated, as desired, if the copyright owner of the content data permits copying it, as desired. This can be implemented for example as follows: a new value, such as FE(h) is added to the number of licenses owned Sub_Move and if Sub_Move=FE(h) then replication is allowed as desired, and the FIG. 13 decision step S322 is provided with a new branch for Sub_Move=FE(h) and the step of obtaining AC1 from the license processing unit is obtained and thereafter if Sub_Move=FE(h) then the control moves on to step S332.

In the above description, the embodiments all provide a distribution operation with cellular phone 100 transmitting two authentication data {KPmc(1)//Cmc(1)}KPma and {KPp(1)//Cp(1)}KPma and distribution server 10 authenticating the two authentication data.

However, memory card 110 is detachably attachable and if music is reproduced a content reproduction circuit is not required to be cellular phone 100 having received a distribution. Furthermore, memory card 110 in a reproduction operation reproduces a content reproduction circuit's authentication data {KPp(1)//Cp(1)}KPma which is used in an authentication process and if distribution server 10 does not provide a content reproduction circuit (cellular phone 100) authentication process based on the content reproduction circuit's authentication data {KPp(1)//Cp(1)}KPma the system's security is not impaired.

As such, a similar effect can be achieved if distribution server 10 merely receives authentication data {KPmc(1)//Cmc(1)}KPma of memory card 100 and effects a decryption process with authentication data {KPmc(1)//Cmc(1)}KPma of a destination memory card 110 mainly considered and thus provides an authentication process.

In this case, in the FIG. 9 flow chart, referred to in all of the embodiments, at each of steps S104, S106, S108, and S110 the process for the cellular phone (content reproduction circuit) 100 authentication data {KPpc(1)//Cp(1)}KPma, public encryption key KPp(1) and class certificate Cp(1) can be eliminated to provide an authentication process eliminating authenticating the content reproduction circuit.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

In accordance with the present invention a data distribution system and a recording device can be used in data distribution employing a mobile communication terminal such as a cellular phone.

The invention claimed is:

1. A recording device, comprising:
an interface unit for externally communicating data;
a storage unit for storing therein data storage and access restriction information received through said interface unit, said access restriction information being used to control outputting said data storage from said recording device;
an authentication data hold unit holding a first public encryption key determined to correspond to said recording device and encrypted in a state decryptable with an authentication key, for external output via said interface unit when said data storage and said access restriction information are received;
a first key hold unit holding a first private decryption key provided to decrypt data encrypted with said first public encryption key;
a first decryption unit receiving externally via said interface unit a first symmetric key encrypted with said first public encryption key, and decrypting said first symmetric key;
a second key hold unit holding a second public encryption key different for each said recording device;
a session key generation unit producing a second symmetric key updated whenever said data storage is communicated;
a first encryption unit encrypting said second symmetric key and said second public encryption key with said first symmetric key for output externally via said interface unit;
a second decryption unit receiving said data storage and access restriction information input via said interface unit, for decryption with said second symmetric key, said data storage and access restriction information being encrypted with said second symmetric key and said second public encryption key;
a third key hold unit holding a second private decryption key provided to decrypt data encrypted with said second public encryption key;
a third decryption unit using said second private decryption key to decrypt said data storage and access restriction information encrypted;

a control unit operative, when an external instruction is issued to output said data storage recorded in said storage unit, to refer to said access restriction information in said storage unit to determine whether reproduction information for said data storage may be output, wherein
said storage unit records therein said data storage in one of a state encrypted with said second public encryption key and a state decrypted by said third decryption unit, and
when said control unit determines that said data storage may be output said data storage is output and thereafter as required said control unit changes said access restriction information recorded in said storage unit.

2. The recording device of claim 1, wherein:
said access restriction information includes output frequency limit information limiting a frequency of outputting said data storage from said recording device to different equipment;
said session key generation unit produces a third symmetric key in response to an external first instruction issued to output said data storage to another equipment;
said recording device further includes
an authentication unit receiving via said interface unit a third public encryption key predetermined to correspond to said another equipment and encrypted in a state decryptable with said authentication key, for decryption with said authentication key, and
a second encryption unit operative in response to said first instruction to use said third public encryption key received from said authentication unit, to encrypt said third symmetric key for output to said another equipment, wherein:
in response to said first instruction said interface unit receives and transmits to said second decryption unit a fourth symmetric key produced in said another equipment and encrypted with said third symmetric key and returned;
in response to said first instruction said second decryption unit uses said third symmetric key received from said session key generation unit, to extract said fourth symmetric key encrypted with said third symmetric key;
said storage unit is controlled by said control unit to output said data storage in response to said first instruction;
in response to said first instruction said third decryption unit decrypts said data storage encrypted and output from said storage unit, to extract said data storage;
in response to said first instruction said first encryption unit receives said data storage from one of said third decryption unit and said storage unit for encryption with said fourth symmetric key extracted by said second decryption unit, for output via said interface unit to said another equipment; and
in response to said first instruction said control unit controls an operation of each component internal to said recording device and said control unit refers to said access restriction information to determine whether said data storage may be output and said control unit refers to said output frequency limit information in said storage unit to determine whether said data storage may be output and when said control unit so determines said data storage is output and thereafter as required said control unit changes said output frequency limit information recorded in said storage unit.

3. The recording device of claim 1, wherein:
said access restriction information includes replication frequency limit information limiting a frequency of outputting said data storage from said recording device to another recording device;

said session key generation unit produces said third symmetric key in response to an external second instruction issued to output said data storage from said recording device to another recording device;

said recording device further comprises an authentication unit receiving through said interface unit and obtaining through decryption said first public encryption key decryptably encrypted with said authentication key and corresponding to said another recording device, and a second encryption unit responsive to said second instruction to use said first public encryption key corresponding to another recording device to encrypt said third symmetric key generated at said session key generation unit, for output to said another recording device;

in response to said second instruction said interface unit receives a fourth symmetric key generated at said another recording device and encrypted with said third symmetric key and returned, and transmits said fourth symmetric key to said second decryption unit;

in response to said second instruction said second decryption unit decrypts data encrypted with said third symmetric key corresponding to said recording device, and returned from said another recording device, to obtain said second symmetric key produced by said another recording device and said second public encryption key corresponding to said another recording device;

said storage unit is controlled by said control unit to output said data storage in response to said second instruction;

in response to said second instruction said third decryption unit decrypts said data storage output from said storage unit and encrypted, to extract said data storage;

said recording device further has a third encryption unit operative, when said second instruction issued, to encrypt said data storage received from one of said third decryption unit and said storage unit, with said second public encryption key corresponding to said another recording device;

in response to said second instruction said first encryption unit further encrypts an output of said third encryption unit with said second symmetric key produced by said another recording device, for output via said interface unit to said another recording device; and in response to external said second instruction said control unit controls an operation of each component of said recording device, and refers to said replication frequency limit information in said storage unit to determine whether said data storage may be output and when said control unit so determines said data storage is output and thereafter as required said control unit changes said replication frequency limit information stored in said storage unit.

4. The recording device of claim 1, wherein:
said storage unit further records therein encrypted content data input externally via said interface unit; and
said data storage includes a license key serving as a decryption key decrypting said encrypted content data to obtain plaintext content data.

5. The recording device of claim 1, provided in a form of a memory card.

6. The recording device of claim 1, wherein said storage unit is arranged in a security area inaccessible directly from outside.

7. The recording device of claim 1, wherein:
said storage unit includes a first storage block arranged in a security area inaccessible directly from outside and a second storage block accessible directly from outside;
said access restriction information is recorded in said first storage block; and
said data storage is encrypted and recorded in said second storage block.

8. The recording device of claim 1, wherein:
a storage unit includes a first storage block arranged in a security area inaccessible directly from outside and a second storage block accessible directly from outside; and
said data storage and access restriction information are recorded in said first storage block.

9. The recording device of claim 3, wherein:
in response to said second instruction said control unit outputs said access restriction information for another recording device together with said data storage;
said control unit produces said reproduction limit information for said another recording device and also changes said replication limit information in said access restriction information in said storage unit to said replication limit information produced; and
said third encryption unit encrypts said access restriction information changed, together with said data storage, for application to said first encryption unit.

10. The recording device of claim 1, wherein:
said storage unit further has a third storage block storing therein encrypted data through said interface unit, said third storage block being accessible externally through said interface.

* * * * *